US008296410B1

(12) United States Patent
Myhill et al.

(10) Patent No.: US 8,296,410 B1
(45) Date of Patent: Oct. 23, 2012

(54) BANDWIDTH MANAGEMENT IN A CLIENT/SERVER ENVIRONMENT

(75) Inventors: Robert Myhill, Boston, MA (US); Jeffry C. Flowers, Marblehead, MA (US)

(73) Assignee: Carbonite, Inc., Boston, MA (US)

( * ) Notice: Subject to any disclaimer, the term of this patent is extended or adjusted under 35 U.S.C. 154(b) by 378 days.

(21) Appl. No.: 12/614,174

(22) Filed: Nov. 6, 2009

(51) Int. Cl.
*G06F 15/173* (2006.01)
(52) U.S. Cl. ...................................................... 709/223
(58) Field of Classification Search .................... 709/233
See application file for complete search history.

(56) References Cited

U.S. PATENT DOCUMENTS

| | | | |
|---|---|---|---|
| 5,301,348 A | 4/1994 | Jaaskelainen | |
| 5,333,256 A | 7/1994 | Green et al. | |
| 6,088,030 A | 7/2000 | Bertram et al. | |
| 6,104,397 A | 8/2000 | Ryan et al. | |
| 6,611,850 B1 | 8/2003 | Shen | |
| 6,754,230 B2 * | 6/2004 | Purpura et al. | 370/468 |
| 6,993,404 B2 | 1/2006 | Lev-Ami et al. | |
| 7,228,506 B2 | 6/2007 | Ivanovic et al. | |
| 7,233,571 B1 * | 6/2007 | Krishnamurthy et al. | 370/236 |
| 7,257,640 B1 * | 8/2007 | Callocchia et al. | 709/233 |
| 7,768,920 B2 * | 8/2010 | Goshen et al. | 370/235 |
| 8,032,653 B1 * | 10/2011 | Liu et al. | 709/235 |
| 2002/0087588 A1 | 7/2002 | McBride et al. | |
| 2002/0122077 A1 | 9/2002 | Doney et al. | |
| 2003/0103088 A1 | 6/2003 | Dresti et al. | |
| 2004/0205206 A1 * | 10/2004 | Naik et al. | 709/230 |
| 2005/0114412 A1 | 5/2005 | Gerhard | |
| 2005/0114711 A1 | 5/2005 | Hesselink et al. | |
| 2005/0131990 A1 | 6/2005 | Jewell | |
| 2005/0223277 A1 | 10/2005 | Ballard | |
| 2006/0106708 A1 | 5/2006 | Abushaban et al. | |
| 2006/0225065 A1 | 10/2006 | Chandhok et al. | |
| 2007/0220103 A1 | 9/2007 | Rogers et al. | |
| 2008/0126357 A1 | 5/2008 | Casanova et al. | |
| 2008/0133622 A1 | 6/2008 | Brown et al. | |
| 2008/0301107 A1 * | 12/2008 | Shuster | 707/3 |
| 2009/0254829 A1 | 10/2009 | Rohde | |
| 2010/0192213 A1 * | 7/2010 | Ta et al. | 726/7 |

OTHER PUBLICATIONS

ABC Backup, "ABC Backup Features," ABCBackup.com, Aug. 25, 2006, <http://web.archive.org/web/20060825155101/http://www.abcbackup.com/features.htm>.
ATopSoft, "ATopSoft AutoSave," ATopSoft.com, Sep. 11, 2006, <http://web.archive.org/web/20060911213102/http://www.atopsoft.com/products/autosave/>.
Campbell, "Extending the Windows Explorer with Name Space Extensions," Microsoft Systems Journal, Jul. 1996, <https://65.55.21.250/msj/archive/S332.aspx>.
MOZY, "Mozy Beta User Guide," Mozy.com, Jul. 6, 2006. <http://web.archive.org/web/20060706231749/mozy.com/support/userguide>.

(Continued)

*Primary Examiner* — John MacIlwinen
(74) *Attorney, Agent, or Firm* — Foley and Lardner LLP; John D. Lanza

(57) ABSTRACT

A method of managing bandwidth usage among a plurality of client devices is provided. A request is received at a first device from a second device. The request is to transfer a file between the first device and the second device and includes an identifier of the second device. A client group associated with the second device is determined based on the identifier and used to select a bandwidth usage policy. A data transfer rate for transferring the file between the first device and the second device is determined based on the selected bandwidth usage policy and a bandwidth usage at the first device associated with a plurality of devices. A number of bytes to transfer is determined based on the determined data transfer rate and a time period. A response, which includes the determined number of bytes and the time period, is sent to the second device.

19 Claims, 16 Drawing Sheets

OTHER PUBLICATIONS

Notice of Allowance on U.S. Appl. No. 11/926,946 dated Dec. 23, 2011.
Office Action on U.S. Appl. No. 12/614,080 dated Dec. 19, 2011.
Office Action on U.S. Appl. No. 11/926,946 dated Oct. 14, 2010.
Office Action on U.S. Appl. No. 11/926,946 dated Dec. 22, 2010.
Office Action on U.S. Appl. No. 11/926,946 dated Jul. 11, 2011.
Office Action on U.S. Appl. No. 11/926,946 dated Jul. 15, 2010.
Office Action on U.S. Appl. No. 11/926,946, dated Sep. 10, 2010.
Office Action on U.S. Appl. No. 12/614,155 dated Dec. 6, 2011.

PASH, "Hack Attack: Using Subversion with TortoiseSVN," Lifehacker.com, Aug. 8, 2006.<http://lifehacker.com/192367/hack-attack-using-subversion-with-tortoisesvn>.
TortoiseCVS. "TortoiseCVS User's Guide."N.p., Jan. 9, 2005. Web. Jun. 30, 2011. <http://web.archive.org/web/20050109034319/http://www.tortoisecvs.org/UserGuide_en.chm>. 47 pages.
TortoiseSVN, "Context menus in Windows Explorer," Tortoisesvn.tigris.org, Sep. 25, 2006, <http://web.archive.org/web/20060925040147/http://tortoisesvn.tigris.org/ExplorerIntegration.html>.

* cited by examiner

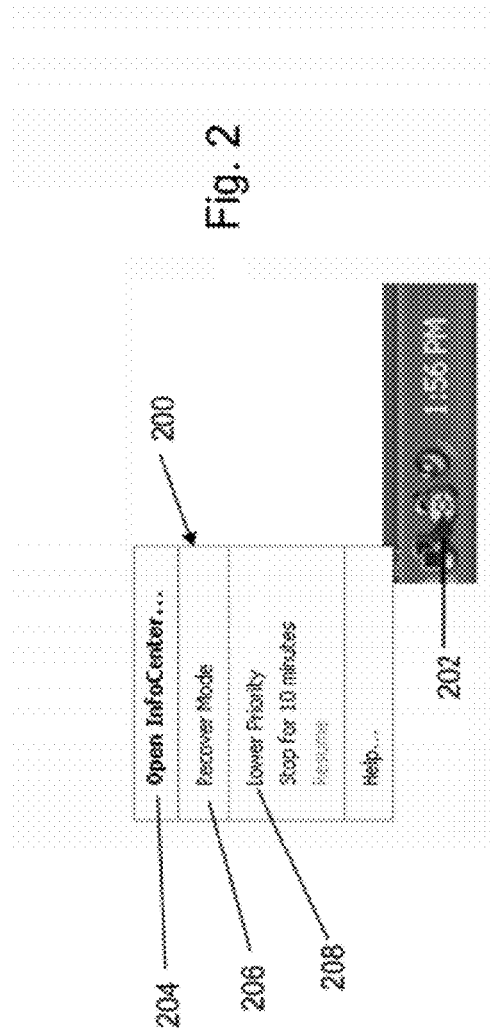
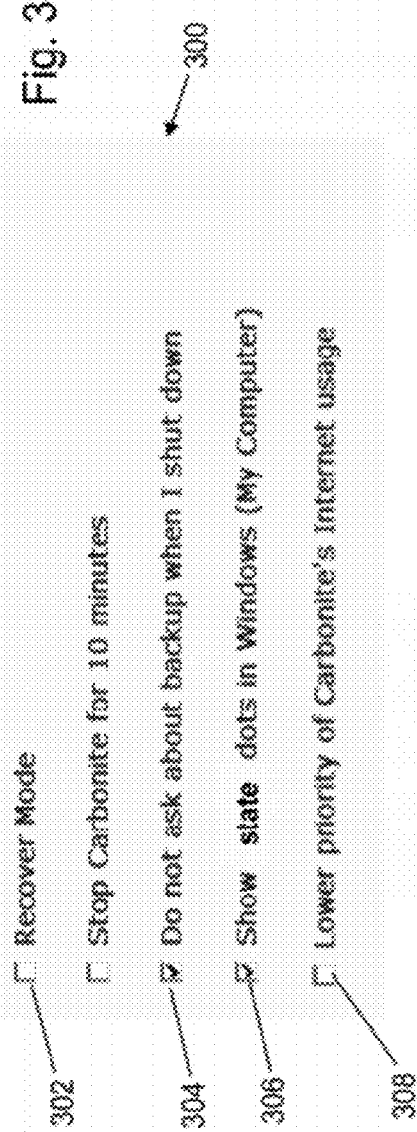

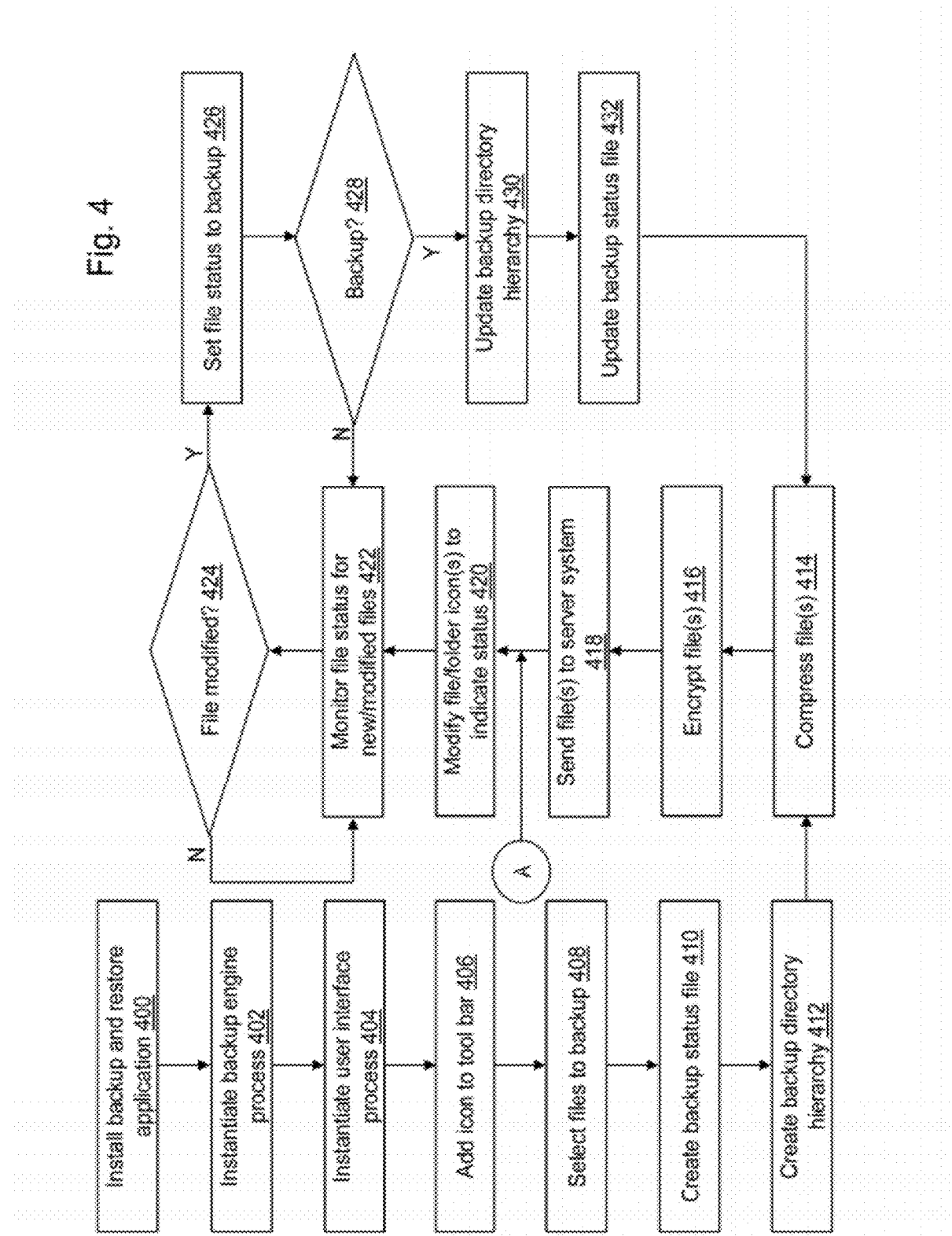

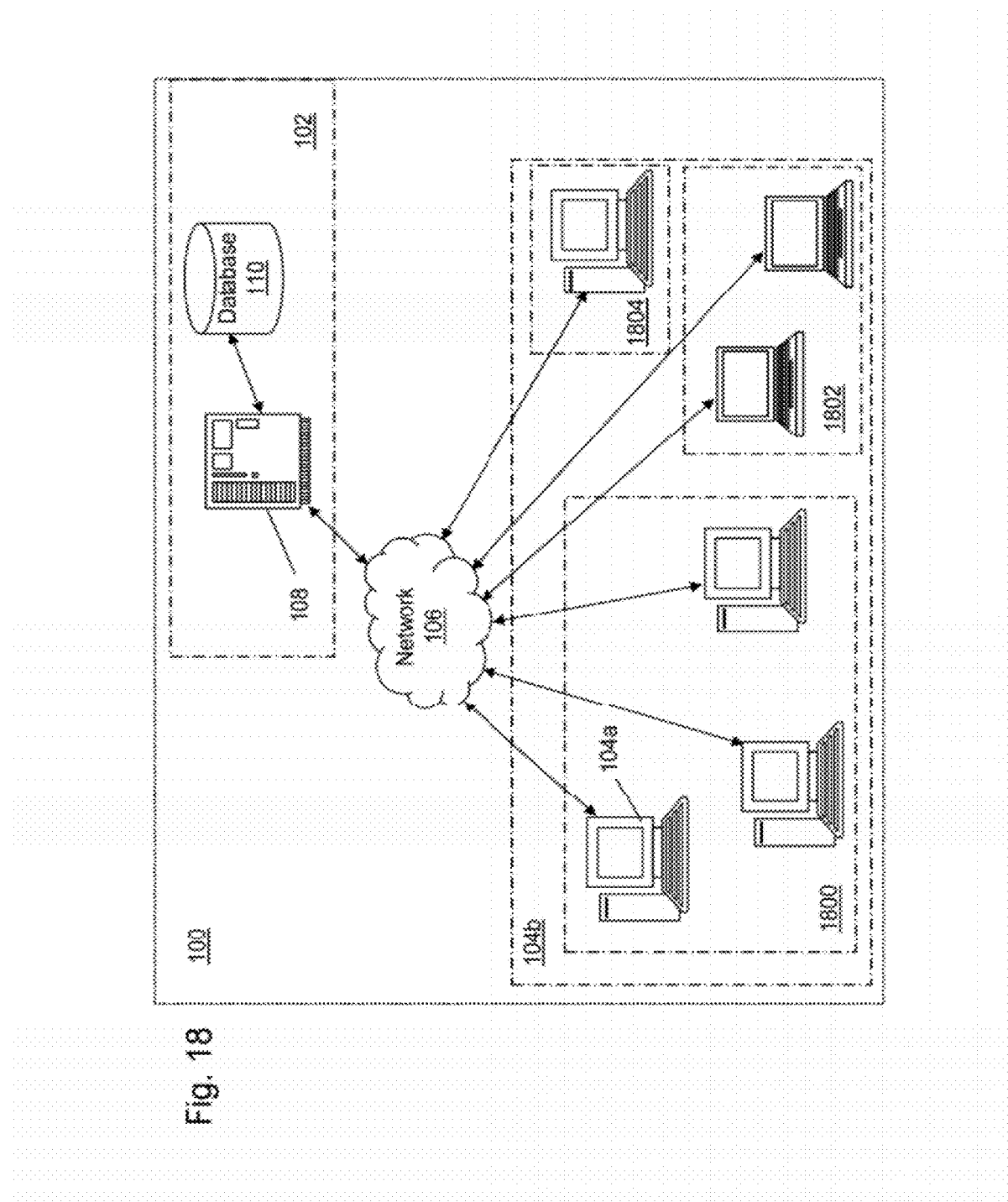

BANDWIDTH MANAGEMENT IN A CLIENT/SERVER ENVIRONMENT

BACKGROUND

Computer systems are ubiquitous in today's work and home environments. The data stored on these computer systems, however, is vulnerable to theft, fire, flood, and other natural disasters. However, only 2% of home personal computers (PCs) are backed up regularly. PC users can perform their own backups using various media such as compact disks (CDs) or external hard drives. CDs and external hard drives can be expensive and also are vulnerable to theft, fire, flood, and other natural disasters. As a result, online backup services have been developed to provide backup of home PCs. The home PCs, or client computing devices, backup their files to and restore their files from server computing devices using a network such as the Internet.

A reliable, massive data storage system is needed to support a backup and restore system for a large number of client computing devices. Such a data storage system should support high data rates while moving files between the client computing devices and the file storage system. Additionally, such a system should provide for reliable data recovery in the event of a disk failure associated with the file storage system. Further, such a system should manage use of the bandwidth associated with the backup and restore of a large number of client computing devices.

SUMMARY

Example embodiments provide a backup and restore system for a computer system that requires little if any interaction by the user. The example embodiments further provide a simple, safe, online backup system for computer users. Some or all of the data on a computer system can be backed up whenever the computer system is connected to a network such as the Internet. The example embodiments further provide a high-speed, reliable data storage system that supports recovery in the event of a disk failure. The example embodiments still further provide a flexible bandwidth management mechanism for balancing the needs of multiple backup system users.

In an example embodiment, a method of managing bandwidth usage among a plurality of client devices is provided. A request is received at a first device from a second device. The request is to transfer a file between the first device and the second device and includes an identifier of the second device. A client group associated with the second device is determined based on the identifier and used to select a bandwidth usage policy. A data transfer rate for transferring the file between the first device and the second device is determined based on the selected bandwidth usage policy and a bandwidth usage at the first device associated with a plurality of devices. A number of bytes to transfer is determined based on the determined data transfer rate and a time period. A response, which includes the determined number of bytes and the time period, is sent to the second device In another example embodiment, a computer-readable medium is provided comprising computer-readable instructions that, upon execution by a processor, cause the processor to perform the operations of the method of managing bandwidth usage among a plurality of client devices.

In yet another example embodiment, a device is provided. The device includes, but is not limited to, a processor, a communication interface, and the computer-readable medium. The communication interface operably couples to the processor. The communication interface is configured to receive a request from a second device and to send a response to the second device. The computer-readable medium operably couples to the processor. The computer-readable medium comprises instructions that, upon execution by the processor, perform the operations of the method of managing bandwidth usage among a plurality of client devices.

Other principal features and advantages of the invention will become apparent to those skilled in the art upon review of the following drawings, the detailed description, and the appended claims.

BRIEF DESCRIPTION OF THE DRAWINGS

Example embodiments of the invention will hereafter be described with reference to the accompanying drawings, wherein like numerals denote like elements.

FIG. 2 depicts a menu list of a backup and restore application in accordance with an example embodiment.

FIG. 3 depicts a user interface of a backup and restore application in accordance with an example embodiment.

FIG. 4 is a flow diagram illustrating example operations performed by a backup application in accordance with an example embodiment.

FIG. 18 depicts a grouping of client devices in the backup and restore system of FIG. 1 to support bandwidth management in accordance with an example embodiment.

DETAILED DESCRIPTION

Figure 1:
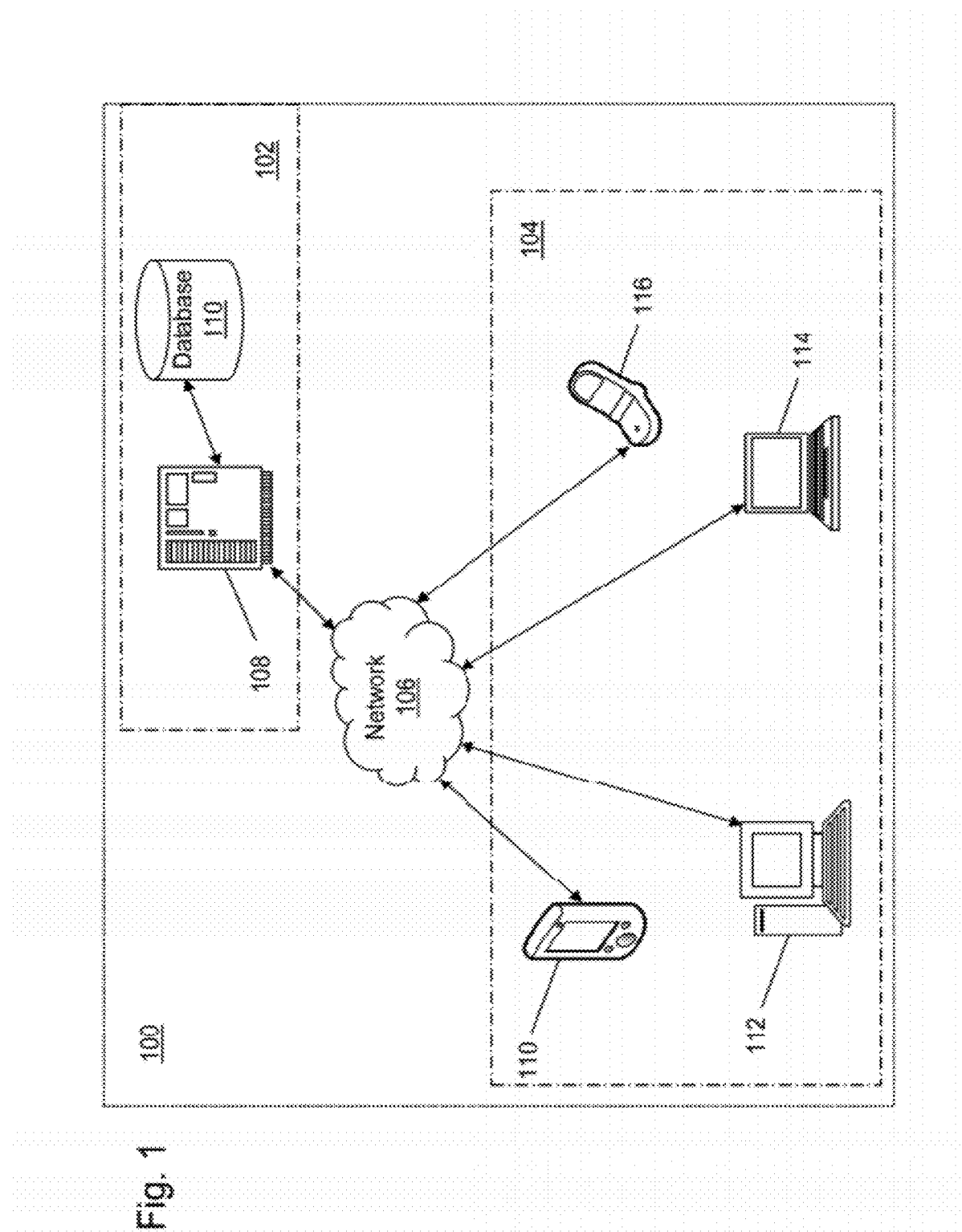
FIG. 1 depicts a system that includes devices implementing a backup and restore system in accordance with an example embodiment.

With reference to FIG. 1, a system diagram of a backup and restore system 100 is shown in accordance with an example embodiment. Backup and restore system 100 may include a server system 102, a plurality of client computing devices 104, and a network 106. There may be fewer or additional networks in backup and restore system 100. For example, backup and restore system 100 may include a cellular network. Server system 102 may include a server 108 and a database 110.

In backup and restore system 100, the plurality of computing devices 104 send and receive signals through network 106 to/from server system 102. Backup and restore system 100 can include any number and type of computing devices 104 that may be organized into subnets. The plurality of computing devices 104 may include computers of any form factor such as a laptop 114, a desktop 112, an integrated messaging device, a personal digital assistant 110, a cellular telephone 116, an IPod, etc. Backup and restore system 100 may include additional types of devices. The plurality of computing devices 104 communicate using various transmission media that may be wired or wireless as known to those skilled in the art. The plurality of client computing devices 104 may communicate information as peers in a peer-to-peer network using network 106.

Server 108 includes or can access database 110 either through a direct connection or through a second network. Database 110 may include a plurality of databases that may be organized into multiple database tiers to improve data management and access. Database 110 is a data repository for backup and restore system 100. Database 110 may utilize various database technologies and a variety of different formats as known to those skilled in the art including a file system, a relational database, and/or a system of tables, etc.

Figure 14:
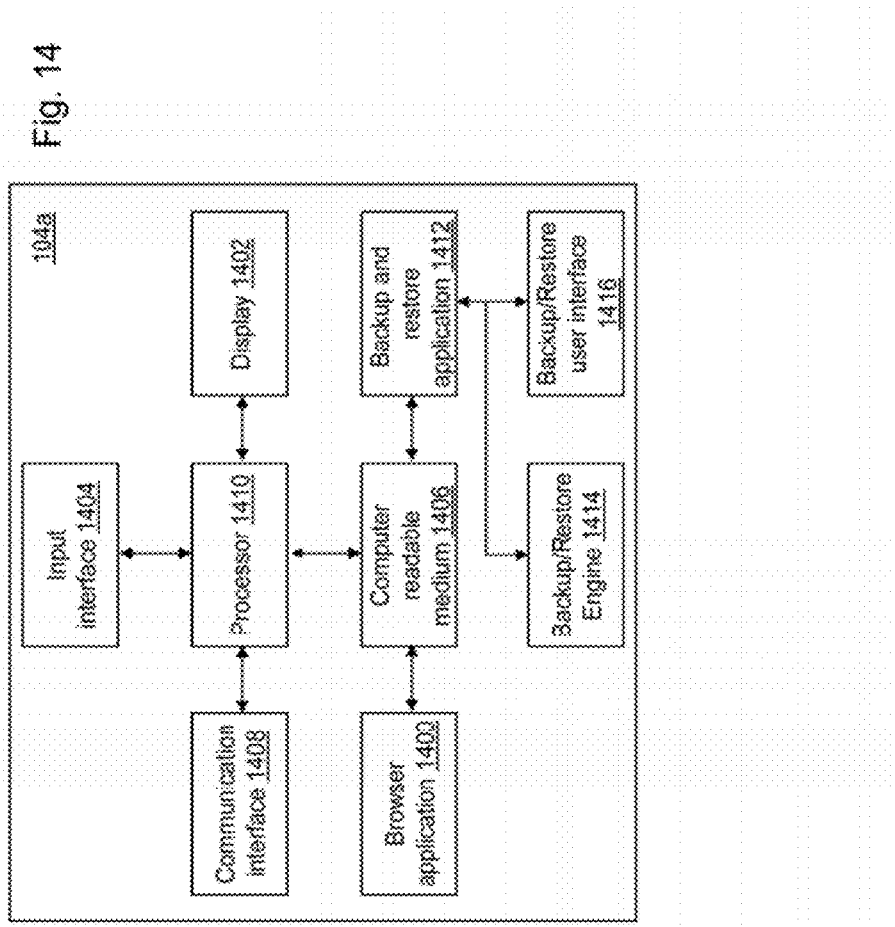
FIG. 14 is a block diagram of a first device executing the backup and restore system in accordance with an example embodiment.
Figure 15:
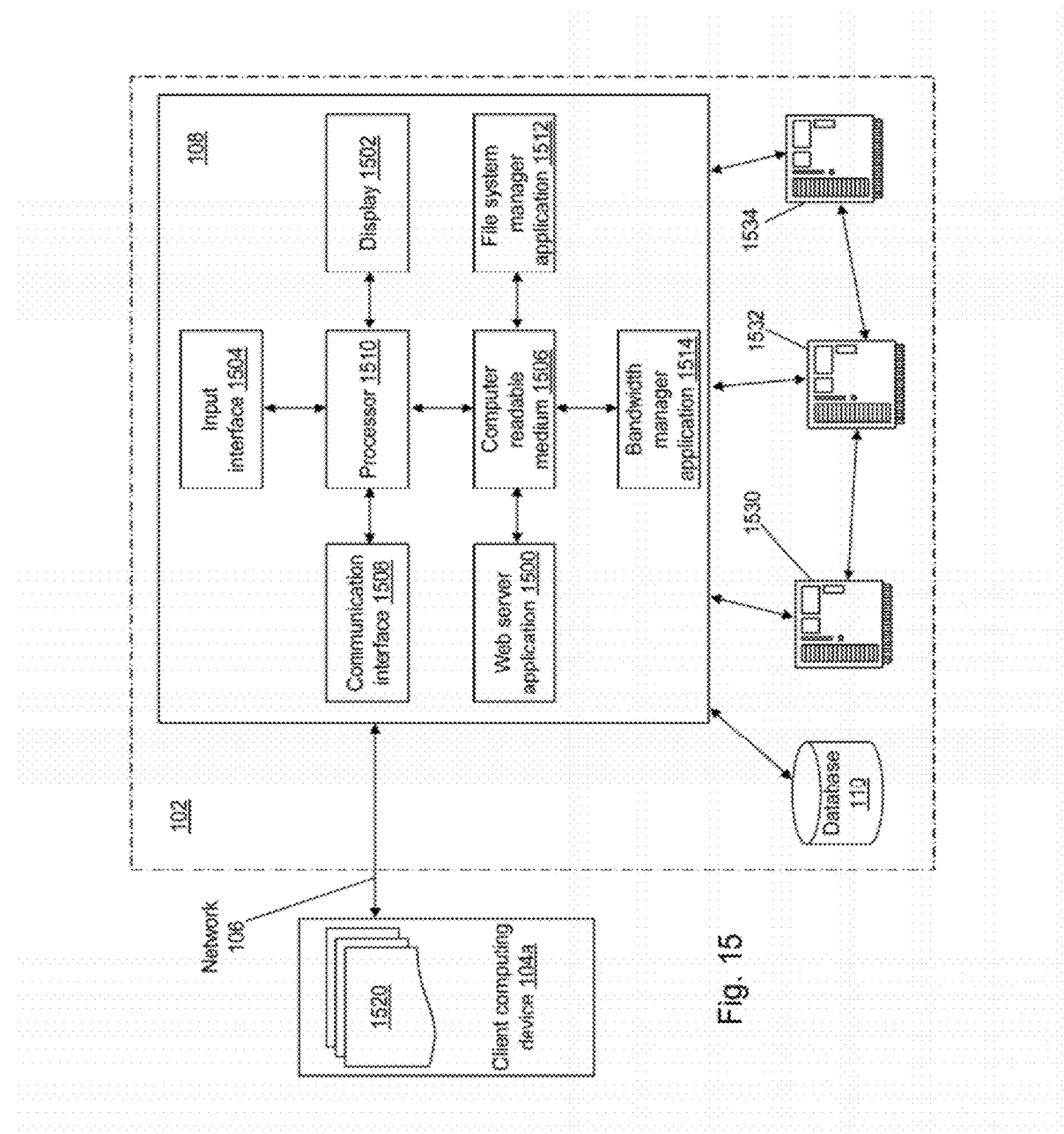
FIG. 15 depicts a server system of the system of FIG. 1 in communication with the first device to support the backup and restore of electronic files from the first device of FIG. 14 in accordance with an example embodiment.

In an example embodiment, network 106 is the Internet. With reference to FIGS. 14 and 15, a user may use a browser application 1400 installed at a client computing device 104a to access a web server application 1500 hosted at server 108. Through interaction with web server application 1500, the user may download and install a backup and restore application 1412 at client computing device 104a. Web server application 1500 may control the display of multiple web pages that present information to the user and from which the user may make selections. A web page may contain links to other web pages with related or additional information. Each web page is identified by a uniform resource locator that includes the location or address of the computer that contains the resource to be accessed in addition to the location of the resource on that computer. The type of file or resource depends on the Internet application protocol. For example, the Hypertext Transfer Protocol (HTTP) may describe a web page to be accessed with browser application 1400.

After installation of backup and restore application 1412 at client computing device 104a, one or more processes may be instantiated at client computing device 104a to support the operations associated with backup and restore application 1412. Message transmissions between the plurality of computing devices 104 and server 108 using network 106 may be transmitted using HTTP over secure sockets layer (HTTPS). Other methods may be used as known to those skilled in the art.

With reference to FIGS. 2 and 14, a menu list 200 for backup and restore application 1412 is provided in accordance with an example embodiment. Menu list 200 may be accessed, for example, by right-clicking on an application icon 202 in a system tray of client computing device 104a after installation of backup and restore application 1412. Application icon 202 may change color or shape to indicate an overall status of the backup processing at client computing device 104a. For example, application icon 202 may change to a green color to indicate all files selected for backup are currently backed up. Application icon 202 may change to a yellow color to indicate that files are currently being backed up. Application icon 202 may change to a red color to indicate that there is a problem associated with execution of backup and restore application 1412.

Menu list 200 may include an open menu item 204, a recover mode menu item 206, and a priority menu item 208. Menu list 200 may include fewer or additional menu items. A user may select any of open menu item 204, recover mode menu item 206, and priority menu item 208 from menu list 200 using an input interface 1404 as known to those skilled in the art. Selection of open menu item 204 opens a user interface window of backup and restore application 1412 which may be presented to a user of client computing device 104a, for example, using a display 1402.

Selection of recover mode menu item 206 causes backup and restore application 1412 to enter a recover mode. The recover mode, for example, may be used when a user purchases a new computing device or replaces the hard drive in the current computing device. Recover mode may be continued as long as needed, but, in an example embodiment, no backup is performed while backup and restore application 1412 is in the recover mode. Without an entry into the recover mode, backup and restore application 1412 may determine that all of the files on client computing device 104a have been deleted and that the user would like to remove the files from backup.

After the files have been restored to the new computing device or the new hard drive, backup and restore application 1412 may automatically exit the recover mode. Alternatively, a user may discontinue the recover mode by de-selecting recover mode menu item 206. In an example embodiment, application icon 202 in the system tray may change color or shape to indicate entry into the recover mode. An alert may be displayed in a user interface window of backup and restore application 1412 to advise the user that backup processing has been suspended.

Selection of priority menu item 208 causes backup and restore application 1412 to slow down its use of network 106 to avoid interference with other network-intensive hardware/software. For example, upon selection of priority menu item 208, backup and restore application 1412 may detect activity at client computing device 104a. If activity is detected, backup processing may be stopped or the priority of backup processing may be reduced.

Double-clicking on application icon 202 may open a user interface window of backup and restore application 1412 which provides detailed information associated with backup and restore application 1412. For example, with reference to FIGS. 3 and 14, a user interface window 300 of backup and restore application 1412 is provided in accordance with an example embodiment. Backup and restore application 1412 may include additional user interface windows. User interface window 300 also may be accessed, for example, by selecting open menu item 204 from menu list 200. User interface window 300 may include a recover mode check box 302, a shutdown check box 304, a state indicator check box 306, and a priority check box 308. User interface window 300 may include fewer or additional check boxes or other user interface controls. A user may select any of recover mode check box 302, shutdown check box 304, state indicator check box 306, and priority check box 308 using input interface 1404.

Selection of recover mode check box 302 causes backup and restore application 1412 to enter the recover mode. Selection of shutdown check box 304 causes backup and restore application 1412 to suspend presentation of a text box to the user when the user shuts down client computing device 104*a*. If shutdown check box 304 is not selected, a text box is presented to the user to ask if client computing device 104*a* should be backed up before shutting down client computing device 104*a*. Selection of state indicator check box 306 causes backup and restore application 1412 to show the backup status of electronic files in a user interface displaying a file system of client computing device 104*a*. Selection of priority check box 308 causes backup and restore application 1412 to slow down its use of network 206 to avoid interference with other network-intensive hardware/software.

With reference to FIGS. 1, 2, 4, and 14, example operations associated with a backup process are described. Additional, fewer, or different operations may be performed, depending on the embodiment. The order of the operations is not intended to be limiting. In an operation 400, backup and restore application 1412 is installed at client computing device 104*a*. Backup and restore application 1412 may be downloaded and installed from a web page as known to those skilled in the art. In an operation 402, a first process executing a backup/restore engine 1414 is instantiated. The first process controls the monitoring of files to backup and the transmission of files to server 108. In an operation 404, a second process executing a backup/restore user interface 1416 is instantiated. In an example embodiment, the second process initiates a registration process at client computing device 104*a*, connects to server 108, registers client computing device 104*a* with server 108, downloads activation data from server 108, and starts backup service processing.

Backup/restore engine 1414 and backup/restore user interface 1416 run in the background at client computing device 104*a* to ensure that new and/or modified electronic files are backed up. Backup operations, however, may automatically be reduced to a low priority mode (for example, by selection of priority menu item 208) when a user is actively using client computing device 104*a* and may be increased when client computing device 104*a* is idle. For example, backup/restore engine 1414 may detect keyboard and mouse activity to determine whether or not a user is actively using client computing device 104*a* and to limit backup processing during active use. Backup processing may be reduced or stopped until expiration of a predetermined period of time during which no activity is detected. For example, backup/restore engine 1414 may "go to sleep" until two minutes of inactivity have been detected. Additionally or in the alternative, backup and restore application 1412 may reduce the packet size and/or may suspend packet streaming during active use. For example, the packet size may be reduced from approximately 8,000 bytes to approximately 1,400 bytes. Instead of packet streaming, a single packet may be sent at a time. After acknowledgement, another packet may be sent. After expiration of a predetermined period of time during which no activity is detected, backup operations may be reinitiated and/or the priority of backup processing increased. For example, after expiration of the predetermined period of time during which no activity is detected, the packet size may be increased from approximately 1,400 bytes to approximately 8,000 bytes and/or packet streaming may be used. Additionally, backup/restore engine 1414 may detect whether a different software application is executing and, for example, using more than a predetermined percentage of processing time and reduce backup processing in response. As another possibility, server 108 may direct client computing device 104*a* to delay or reduce processing, for example, if client computing device 104*a* is using more than a predetermined allowable transfer amount/rate.

Use of a low priority mode when a user is using client computing device 104*a* prevents backup and restore application 1412 from slowing down other applications executing at client computing device 104*a* or from slowing down Internet browsing. Prior art backup products require a user to schedule backup execution times. Using backup and restore application 1412, the backup may execute continuously, but slow or even stop execution whenever client computing device 104*a* is being used for other processing.

In an operation 406, application icon 202 is added to the system tray of client computing device 104*a* as known to those skilled in the art. In an operation 408, files are selected for backup to server system 102. For example, as part of the installation process, a user may select from a plurality of options for selecting the files to backup. The options may be presented to the user using web server application 1500. In an example embodiment, a user can select an option listing one or more predefined folders for backup. For example, if client computing device 104*a* is executing a Windows® operating system, the "My Documents" and "Desktop" folder may be predefined for backup as an option presented to a user. In an example embodiment, a user can select an option not to backup any files automatically. If a user selects this option, the user may individually select the files, folders, and/or drives in the file system of client computing device 104*a* for backup. In an example embodiment, a user can select an option to backup all electronic files on client computing device 104*a*.

In an example embodiment, a user can select an option to backup certain file types automatically or not to backup certain file types automatically. For example, all image files may be selected for backup while all executable files are not selected for backup. Additionally, certain file/folder/drive types may be excluded from backup automatically. For example, executable files, dynamic link library files, temporary folders, hidden system folders, and non-permanent disk drives such as network and removable drives may be excluded from backup.

The files selected for backup may be determined based on the option(s) selected by the user. This information may be captured in a backup profile defined for the client computer system as part of the installation process. For example, the backup profile may be included with the activation data downloaded from server 108. The backup profile determines whether a file is, by default, included or excluded from backup processing.

In an operation 410, a backup status file is created to maintain the backup status and backup state information for each file selected for backup. In an example embodiment, the backup status file includes a full path and filename for a file, a unique identifier for the file, a date of last backup of the file, a time of last backup of the file, a creation time of the file, a most recent modification time for the file, a compressed file size of the file, an uncompressed file size of the file, and a backup state flag indicating a backup state of the file. Backup status information may include the date of last backup of the file, the time of the last backup of the file, and the most recent modification time.

The unique identifier for the file may include a device identifier for client computing device 104*a*, a session identifier, a file identifier, and a file version number. In an example embodiment, server 108 constructs a folder and filename from the unique identifier. For example, the unique identifier may be 'C317-S342-F000771-V000002' and the constructed folder and filename may be C:\C317\S342\C317-S342-F000771-V000002, where '0317' is the device identifier for client computing device 104*a*, 'S342' is the session identifier, 'F000771' is the file identifier, and 'V000002' is the file version number. Backup state information includes whether or not the file is to be backed up, is awaiting backup, is to be removed from backup, etc. Additional files may be created. For example, various log files may be created to facilitate the diagnosis of errors that may occur during execution of backup and restore application 1412. Additionally, encryption data/digests may be captured in files stored at client computing device 104a.

In an operation 412, a backup directory hierarchy is created. The backup directory hierarchy includes a user interface that indicates a hierarchy of files, folders, and/or drives selected for backup and is displayed in a file system user interface of client computing device 104a. The backup directory hierarchy shows the same folder structure as the physical drive of client computing device 104a. As known to those skilled in the art, the drives may be internal hard drives, external hard drives, external media drives of various types, network drives, etc.

Figure 5:
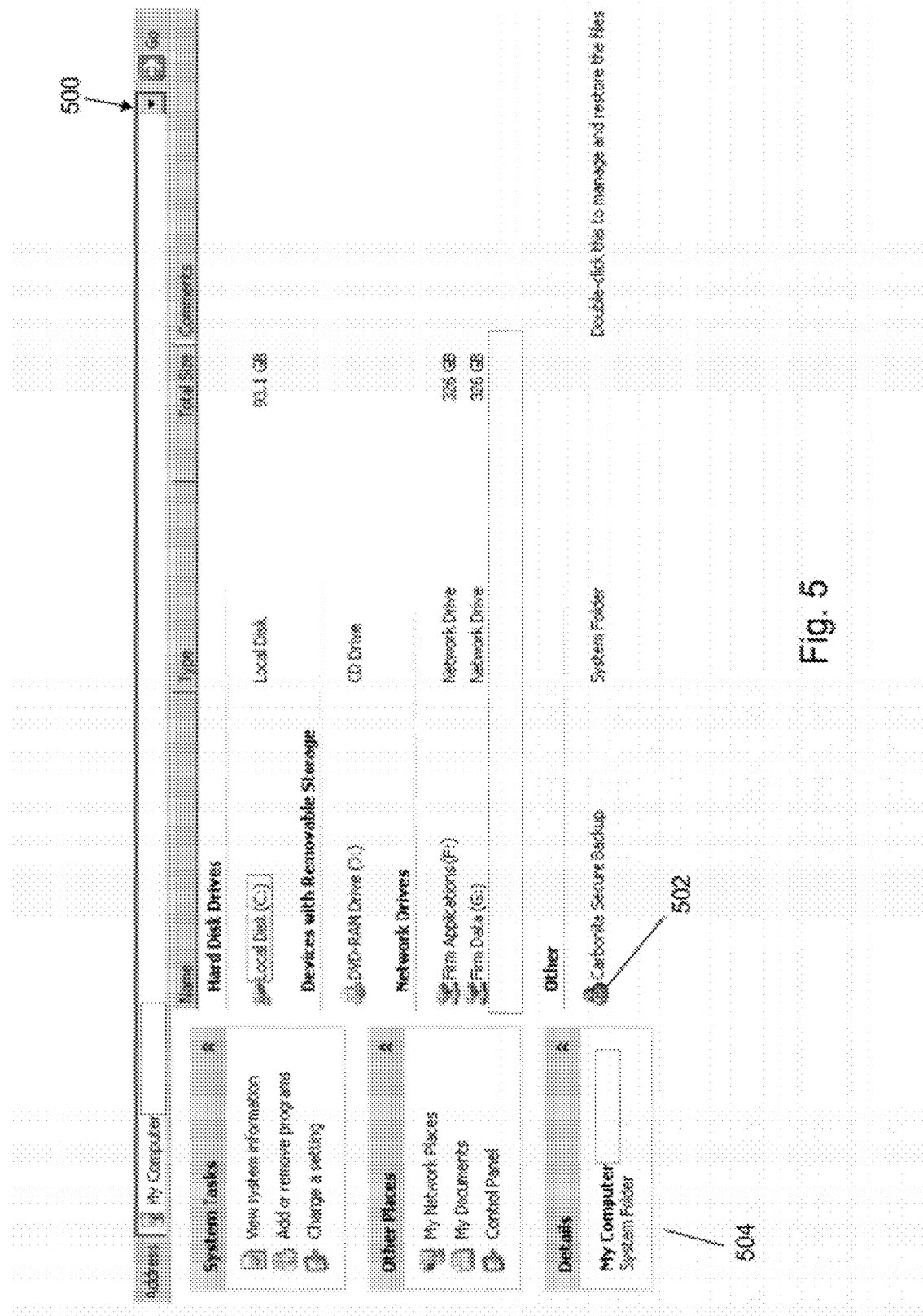
FIG. 5 depicts a first user interface of a file system in accordance with an example embodiment.

With reference to FIGS. 5 and 14, a first user interface 500 of the file system user interface application of client computing device 104a is provided. The first user interface 500 includes a virtual folder 502 and a task pane 504. In an example embodiment, the file system user interface application is the Windows Explorer® application which provides a graphical user interface for accessing the file system of client computing device 104a. The backup directory hierarchy created is presented to a user through interaction with virtual folder 502.

Figure 6:
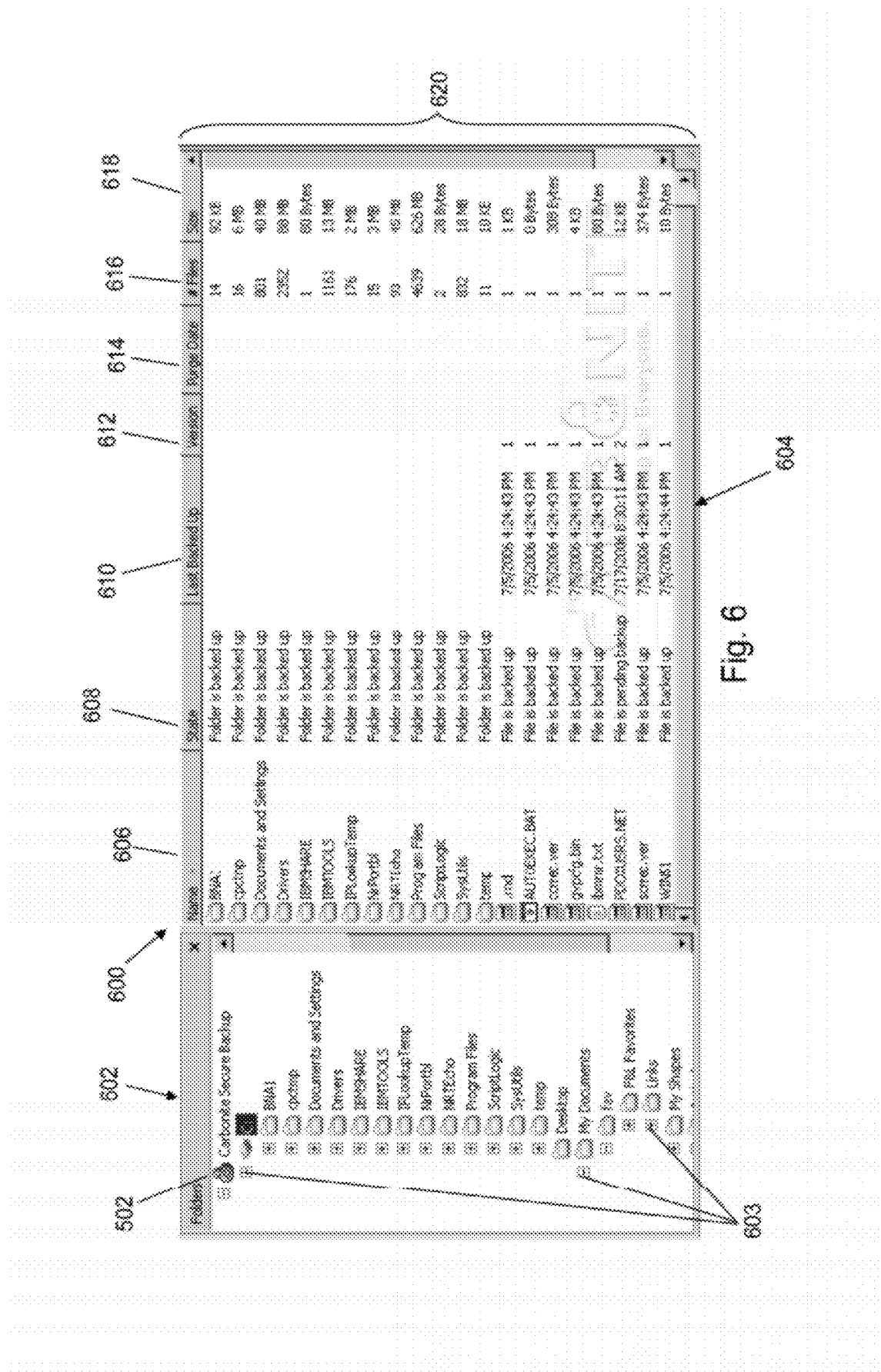
FIG. 6 depicts a second user interface of the file system in accordance with an example embodiment.

Selection of virtual folder 502 in first user interface 500 causes the next level in the backup directory hierarchy to be displayed to a user in a folder view. For example, user selection of virtual folder 502 causes presentation of a second user interface 600 as shown with reference to FIGS. 6 and 14, in accordance with an example embodiment. Second user interface 600 may include a tree view 602 of the backup directory hierarchy and a folder view 604 of the backup directory hierarchy. As known to those skilled in the art, using tree view 602 of the backup directory hierarchy, a user can select a folder for which to display its content in folder view 604. For example, in the example embodiment of FIG. 6, folder view 604 displays the folders and files backed up in the 'C' drive of client computing device 104a. A user can select a '+' or '−' icon 603 next to a folder icon to collapse or expand the hierarchical view of the backup directory hierarchy. Tree view 602 displays the directory structure of the backup directory hierarchy. Tree view 602 may be replaced with task pane 504 as known to those skilled in the art.

In an example embodiment, the backup directory hierarchy is implemented as a namespace extension. The Microsoft® Windows shell uses a single hierarchical namespace to organize all objects, including files, storage devices, printers, and network resources. The Windows application can be thought of as the shell namespace viewer. Using a namespace extension, the Windows Explorer application presents data to a user as a virtual folder such as virtual folder 502. A namespace extension is a special common object model (COM) object that provides a mechanism for creating custom functionality for the Windows Explorer application. For example, using a namespace extension the Windows Explorer application can be controlled to create a virtual folder of files/folders/drives in the Windows shell. The backup directory hierarchy is a virtual folder that describes the location of actual files/folders/drives stored on or accessible from client computing device 104a and selected for backup using backup and restore application 1412.

A namespace extension generally consists of two basic components: a data manager, and an interface between the data manager and the Windows Explorer application. Thus, there is a separation of functionality. The data manager knows the state of backup and restore application 1412, but has no user interface functionality. In contrast, the interface handles the user interface functionality, but does not intrinsically know the state of backup and restore application 1412. In the example embodiment, backup/restore engine 1414 acts as the data manager for backup and restore application 1412 by maintaining the current backup status of each file/folder/drive. For example, backup/restore engine 1414 maintains the status flags in the backup status file.

Backup/restore user interface 1416 acts as the interface for backup and restore application 1412 by defining the folder objects and handling the interaction with the Windows Explorer application. The Windows Explorer application calls these components to allow users to view and interact with the backup directory hierarchy as if it were a collection of drives, folders, and files. The Windows Explorer application manages tree view 602, in which the virtual folder 502 is shown. Virtual folders may be defined as folder-like user interfaces that expose the functionality provided by a namespace extension. Unlike tree view 602, the Windows Explorer application does not directly control the contents of folder view 604. Instead, backup/restore user interface 1416 controls the display and management of the contents in folder view 604. Backup/restore user interface 1416 and backup/restore engine 1414 may communicate with each other using a secure COM channel and shared registry access.

Folder view 604 displays the contents of a single folder selected, for example, in tree view 602. Folder view 604 may include a name column 606, a state column 608, a last backup column 610, a backup version number column 612, a purge date column 614, a number of files column 616, and a size column 618. Name column 606 includes a list 620 of file/folder/drive names at the selected directory level. For example, state column 608 includes a current backup state for each file/folder/drive names included in list 620 at the selected directory level. Last backup column 610 includes a last backup time and date for each file included in list 620. Backup version number column 612 includes a version number for each file included in list 620. Purge date column 614 includes a deletion date for each file/folder/drive included in list 620. Number of files column 616 includes a number of files in each file/folder/drive included in list 620. In an example embodiment, number of files column 616 may include the number '1' for a file. Size column 618 includes a size of the files in each file/folder/drive included in list 620.

Referring again to FIGS. 4 and 14, in an operation 414, the files selected for backup are compressed. The files may be compressed singly, in multiple groups (i.e. each folder in a separate group), or into a single file as known to those skilled in the art. In an operation 414, the compressed file(s) is encrypted. An encryption system can execute various cryptographic algorithms that alternatively encrypt or decrypt data. As examples, an encryption system can implement the data encryption standard, the triple data encryption algorithm, the advanced encryption standard, etc. as known to those skilled in the art. In an example embodiment, backup and restore application 1412 implements the Blowfish encryption algorithm with a 1024 bit key. The Blowfish encryption algorithm uses a private encryption key stored at client computing device 104a. A copy of the private encryption keys is also stored in database 110 of server system 102. Data can be recovered only by using the same key used to encipher the data. In an operation 418, the encrypted file(s) is sent to server system 102 and stored in database 110. For example, the encrypted file(s) may be sent to server system 102 using HTTPS to maintain the security of the data during transmission through network 106. Encrypting the file(s) and sending the encrypted files using a secure transmission protocol provides two layers of protection for the electronic files. Encryption of the files before transfer protects the data that is stored at server system 102, for example, from employees that may attempt to view the stored electronic files that may contain personal information of the user.

In an operation 420, file/folder/drive icons are modified to indicate the backup status of the respective file/folder/drive. For example, backup/restore user interface 1416 may indicate to the Windows Explorer application that an overlay icon for file/folder/drive icons is provided. An overlay icon is placed over an existing icon representing the physical file/folder/drive in the Windows Explorer application. The Windows Explorer application calls backup/restore user interface 1416 for each file/folder/drive asking whether to use an overlay icon or not. Backup/restore user interface 1416 checks the status of each file/folder/drive using backup/restore engine 1414. Based on the returned status, backup/restore user interface 1416 tells the Windows Explorer application whether to use an overlay icon or not.

In an example embodiment, overlay icons that include colored dots in the bottom left hand corner of the icon and are transparent everywhere else are used. For example, a blue dot overlay icon on a folder icon may indicate a folder in which all files in that folder (and its subfolders) are selected for backup. A gray dot overlay icon on a folder icon may indicate that only some subfolders and/or files have been selected for backup in that folder. A folder icon not marked by a dot may indicate that there are no files selected for backup in that folder or its subfolders. Backup/restore engine 1414 analyzes the backup directory hierarchy to determine the overlay icon appropriate for each folder/drive. A yellow dot overlay icon on a file icon may indicate that a file is awaiting backup because it is new or has been modified since the last backup. A green dot overlay icon on a file icon may indicate a file that is backed up and has not been modified since the last backup. The lack of any dot on a file icon may indicate the file is not selected for backup.

Figure 7:
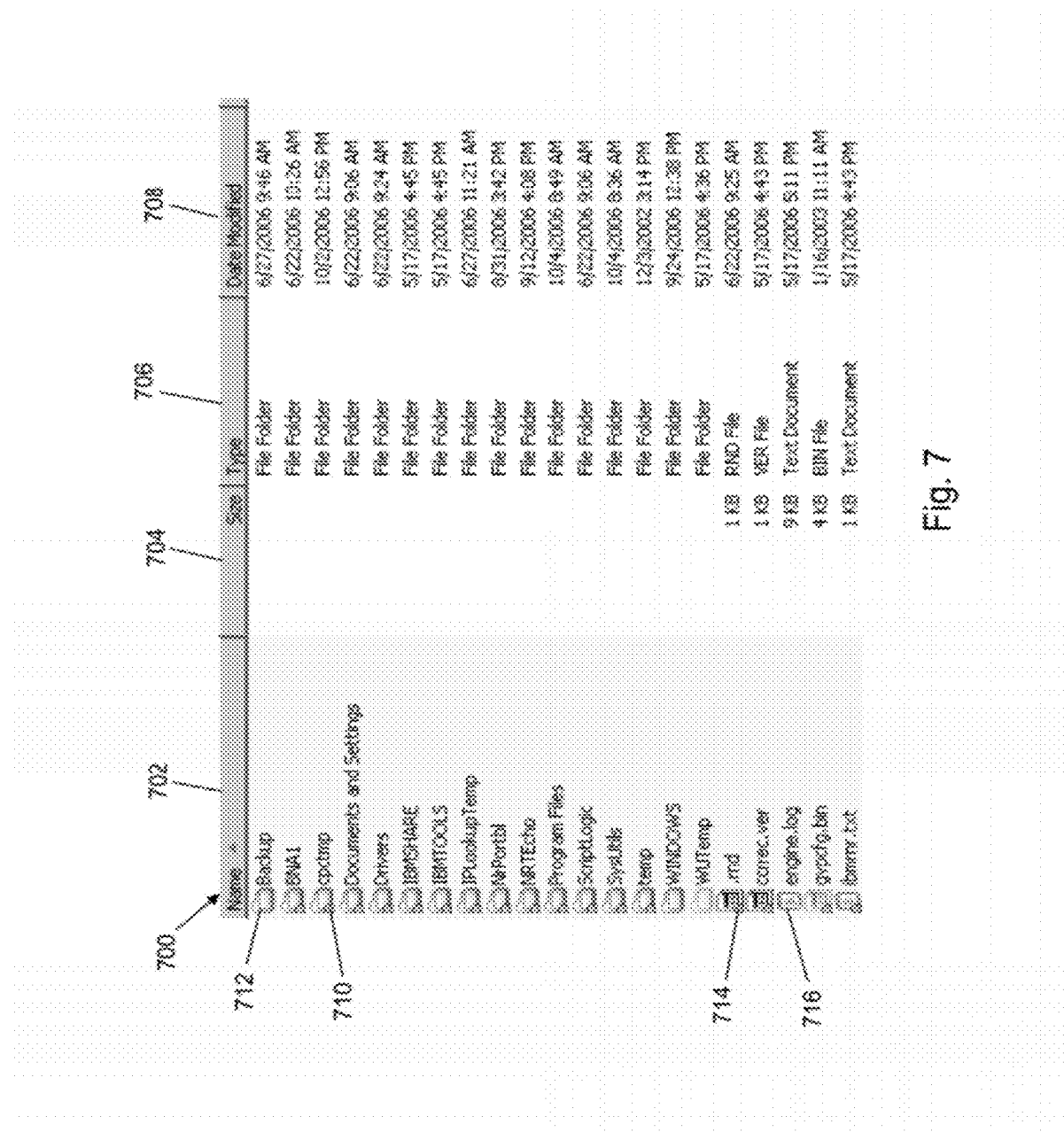
FIG. 7 depicts a third user interface of the file system in accordance with an example embodiment.

With reference to FIG. 7, a third user interface 700 of the file system of client computing device 104*a* is provided to indicate the physical file/folder/drive in the Windows Explorer application. Third user interface 700 may include a name column 702, a size column 704, a type column 706, and a date/time modified column 708. Name column 702 includes a list of file/folder/drive names at the selected directory level. Size column 704 includes a size of each file/folder/drive included in name column 702 at the selected directory level. Type column 706 includes a type of each file/folder/drive included in name column 702 at the selected directory level. Date/time modified column 708 includes a last modification time and date for each file included in name column 702 at the selected directory level.

A folder icon 710 includes an overlay icon indicating a backup state of the folder. A folder icon 712 does not include an overlay icon which may indicate that no files are selected for backup in that folder or its subfolders. However, a user can choose to display the overlay icons or not based on the selection or de-selection of state indicator check box 306 shown with reference to FIG. 3. Thus, a folder icon 712 that does not include an overlay icon may indicate that the user has de-selected state indicator check box 306. A file icon 714 includes an overlay icon indicating a backup state of the file. A file icon 716 does not include an overlay icon which may indicate that the file is not selected for backup.

Figure 8:
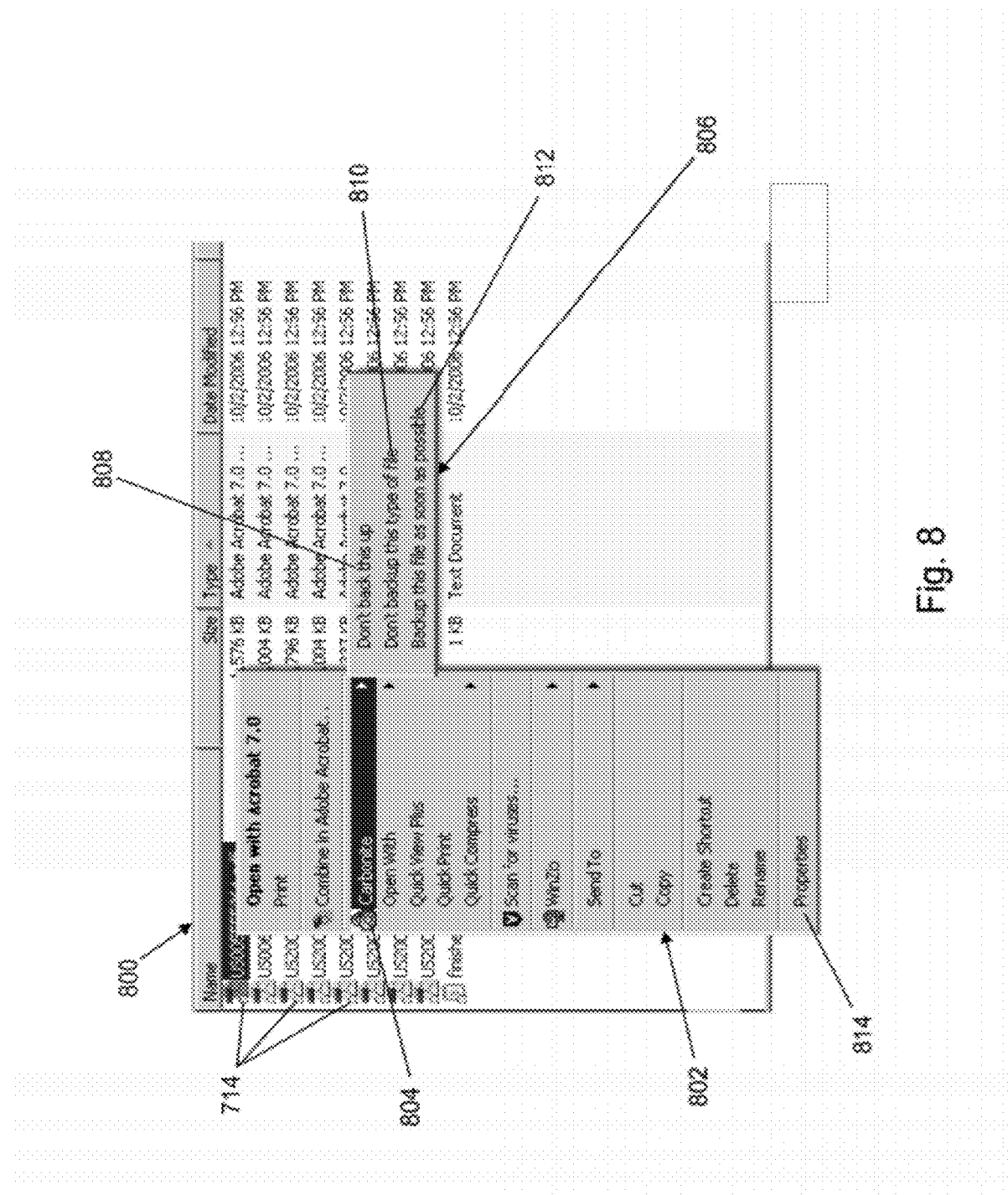
FIG. 8 depicts a fourth user interface of the file system including a pop-up menu in accordance with an example embodiment.

In an example embodiment, a user can select a file/folder/drive for backup or deselect a file/folder/drive from backup using an extension to a context menu. With reference to FIG. 8, a fourth user interface 800 of the file system of client computing device 104*a* is provided which includes a context menu 802 of a selected file/folder/drive. Context menu 802 may be displayed for a selected file/folder/drive by a user right-clicking on the file/folder/drive. Selection of a menu item 804 presented to the user in context menu 802 causes display of a backup option menu 806. Backup option menu 806 may include a first option 808 that allows a user to request that the selected file/folder/drive not be backed up. In response to selection of first option 808 and after a predetermined period of time, the selected file/folder/drive is deleted from server system 102. In an example embodiment, the predetermined period of time is 24 hours. The time delay allows a user to change their mind about removing the selected file/folder/drive from backup.

Backup option menu 806 further may include a second option 810 that allows a user to request that the file type of the selected file not be backed up. The file type generally is indicated by the file extension as known to those skilled in the art. For example, if the file type is a text document, selection of second option 810 changes the backup state of all text documents so that none of them are backed up. A user may individually select a text file for backup, however, to override this selection for individual files. For example, backup option menu 806 further may include a third option 812 that allows a user to request that the selected file/folder/drive be backed up as soon as possible.

Figure 9:
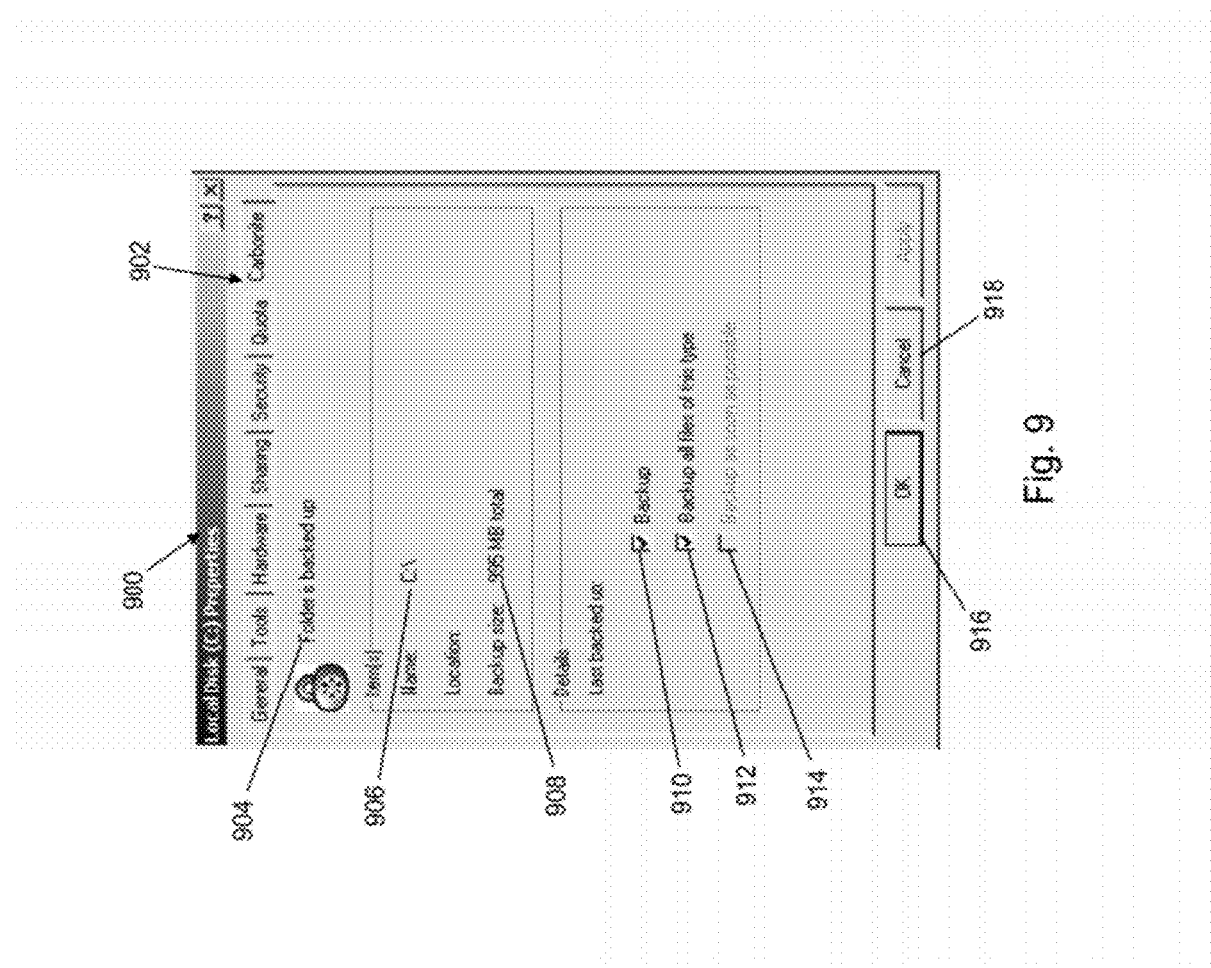
FIG. 9 depicts a first user interface of a properties window in accordance with an example embodiment.

In an example embodiment, a user can determine why a file/folder/drive will not be backed up by selecting a properties menu item 814 presented to the user in context menu 802. A "Properties" dialog box is opened and the user can select a tab in the Properties dialogue box which includes backup details. For example, with reference to FIGS. 8 and 9, a first properties dialog box 900 is provided which includes a tab 902. Selection of tab 902 in first properties dialog box 900 displays a folder state identifier 904, a file/folder/drive name indicator 906, a backup size indicator 908, a first backup check box 910, a second backup check box 912, a third backup check box 914, an OK button 916, and a Cancel button 918. Selection of first backup check box 910 adds the selected file/folder/drive to the files selected for backup. Thus, if a user selects second option 810 to exclude "mp3" files from backup processing, the user can select first backup check box 910 for a particular "mp3" file, and the particular "mp3" file is added to the files selected for backup processing.

Selection of second backup check box 912 allows a user to request that all files having the file type of the selected file be backed up. For example, if the file type is a text document, selection of second backup check box 912 changes the backup state of all text documents so that all of them are backed up. A user may individually de-select a text file for backup, however, using first backup check box 910. Selection of third backup check box 914 allows a user to request that the selected file/folder/drive be backed up as soon as possible. Selection of OK button 916 saves any changes to selections in first properties dialog box 900. Selection of Cancel button 918 cancels any changes to selections in first properties dialog box 900.

Referring to FIGS. 1, 2, 4, 6, and 14, in an operation 422, a status of each of the files selected for backup is monitored. Additionally, new files are identified based on the backup profile to determine if the new files should also be backed up. Backup/restore engine 1414 continuously scans client computing device 104*a* for new and/or modified files to be backed up whether client computing device 104a is connected to network 106 or not. In an operation 424, a determination is made concerning whether or not a file has been modified. If a file has been modified, processing continues at an operation 426. If a file has not been modified, processing continues at operation 422.

In an example embodiment, modified files are identified using a standard Microsoft Windows operating system function ReadDirectoryChanges, which detects changes in directories and files. A call to the function ReadDirectoryChanges indicates the name and type of change to a file system object. If the call returns the name of a file selected for backup processing, the backup state flag and/or the most recent modification time in the backup status file may be changed to indicate that the file should be backed up. Additionally or alternatively, a scan of client computing device 104a may be performed. A comparison between the status of each file to backup, as maintained in the backup status file, and the scan data may be performed to identify modified or new files. For example, a checksum value may be executed for a newly modified file and for the currently backed up version of the file using a variety of algorithms as known to those skilled in the art including cryptographic hash functions. If the calculated checksum values are different, a modification to the file is indicated.

In an operation 426, a file state is set to backup. For example, backup state flags and/or the most recent modification time in the backup status file may be set to indicate that the modified file should be backed up. Additionally, state column 608 of folder view 604 may be changed to indicate that the file is pending backup.

In an operation 428, a determination is made concerning whether or not to initiate the backup of the changed/new files. If a file backup is to be initiated, processing continues at an operation 430. If a file backup is not to be initiated at the current time, processing continues at operation 422. For example, when backup/restore engine 1414 detects that a file has been modified, backup/restore engine 1414 may check to make sure that the file has remained unchanged for a predetermined period of time before the file is made eligible for backup. In an example embodiment, the predetermined period of time is ten minutes. In an example embodiment, a modified file is backed up once every 24 hours to give users the opportunity to restore the previous version if necessary. For example, if a user modifies a file and saves it, backup/restore engine 1414 waits ten minutes before backup of the modified file. If a user modifies the file again, backup/restore engine 1414 may wait up to 24 hours before backing up the file again. An immediate backup of the modified file can be requested by the user, however, by selecting third option 812 or third backup check box 914 for the modified file.

If client computing device 104a is disconnected for an extended period of time, application icon 202 may change to a red color indicating that access to network 106 should be restored as soon as possible. As soon as access to network 106 is restored, backup/restore engine 1414 may initiate the transmission of updates.

In an operation 430, the backup directory hierarchy is updated. For example, state column 608 of folder view 604 may be changed to indicate that the file is backed up and last backup column 610 of folder view 604 may be updated to include the backup date and time. Additionally, new files may be added to the backup directory hierarchy. In an operation 432, the backup status file is updated. For example, the date of last backup of the file, the time of last backup of the file, and the backup state flag indicating the backup state of the file may be updated.

Figure 10:
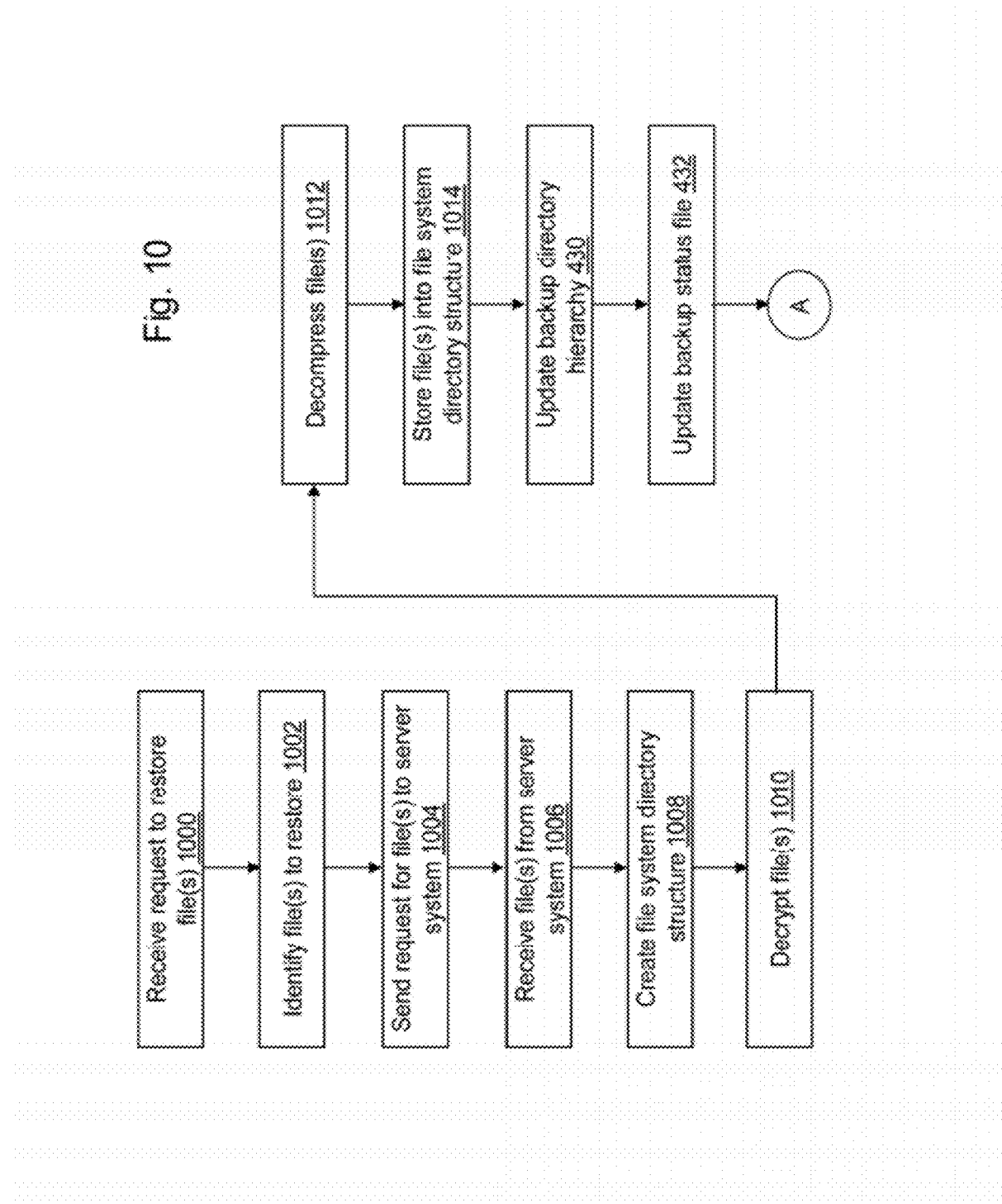
FIG. 10 is a flow diagram illustrating example operations performed by a restore application in accordance with an example embodiment.
Figure 11:
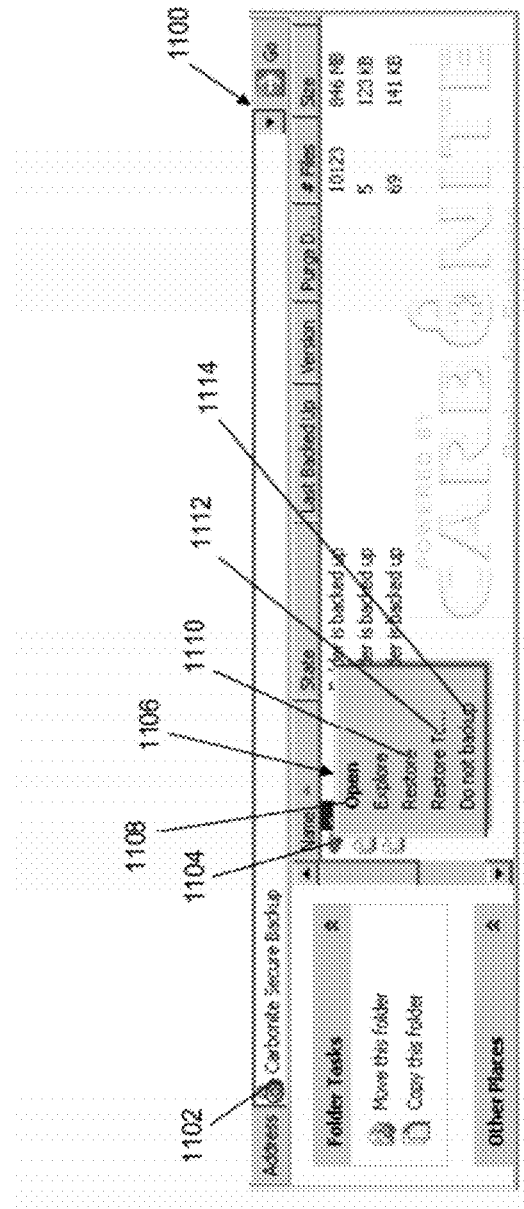
FIG. 11 depicts a fifth user interface of the file system in accordance with an example embodiment.
Figure 12:
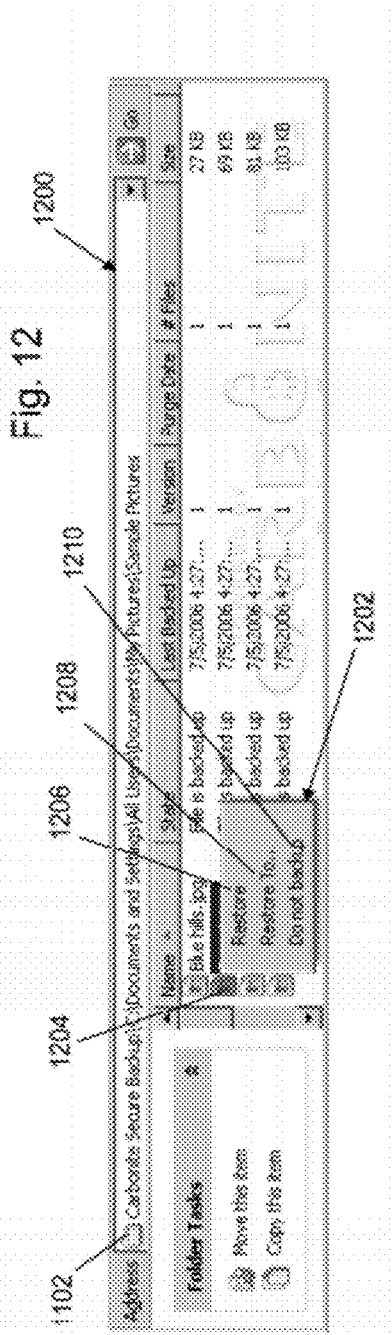
FIG. 12 depicts a sixth user interface of the file system in accordance with an example embodiment.

With reference to FIGS. 5, 10, 14, example operations associated with a restore process are described. Additional, fewer, or different operations may be performed, depending on the embodiment. In an operation 1000, backup and restore application 1412 receives a request to restore a file/folder/drive from a user of client computing device 104a. For example, a user selects virtual folder 502 in first user interface 500. Virtual folder 502 displays the first level of the backup directory hierarchy, which contains a mirror image of the backed up files/folders/drives. A user can select a file, a group of files, a folder, a drive, etc. to restore. For example, with reference to FIGS. 11 and 14, a fifth user interface 1100 of the file system of client computing device 104a is provided which includes a folder options menu 1106 of a 'C' drive 1104. An address bar 1102 indicates the parent folder of the currently displayed files/folders/drives.

Folder options menu 1106 may include a first option 1108, a second option 1110, a third option 1112, and a fourth option 1114. Selection of first option 1108 opens the selected folder for display in fifth user interface 1100 and updates address bar 1102 to indicate the selected folder. Selection of second option 1110 sends a request to backup and restore application 1412 to restore the selected folder/drive. Selection of third option 1112 sends a request to backup and restore application 1412 to restore the selected folder/drive to a different location on client computing device 104a. The user is prompted to select a location as known to those skilled in the art.

Selection of fourth option 1114 sends a request to backup and restore application 1412 that the selected folder/drive is no longer selected for backup processing. Purge date column 614 of folder view 604 indicates the date a deselected folder/drive is removed from server system 102 as a result of user selection of fourth option 1114. In an example embodiment, server system 102 maintains a copy of the selected folder/drive for at least 30 days from the time of selection of fourth option 1114.

As another example, with reference to FIGS. 1, 6, 11, 12, and 14, a sixth user interface 1200 of the file system of client computing device 104a is provided which includes a file options menu 1202 of a file 1204. Address bar 1102 indicates the parent folder of the currently displayed files/folders/drives. File options menu 1202 may include a first option 1206, a second option 1208, and a third option 1210. Selection of first option 1206 sends a request to backup and restore application 1412 to restore the selected file. Selection of second option 1208 sends a request to backup and restore application 1412 to restore the selected file to a different location on client computing device 104a. The user is prompted to select a location as known to those skilled in the art. Selection of third option 1210 sends a request to backup and restore application 1412 to no longer backup the selected file. Purge date column 614 of folder view 604 indicates the date a deleted file is removed from server system 102 as a result of user selection of third option 1210. In an example embodiment, server system 102 maintains a copy of the selected file for at least 30 days from the time of selection of third option 1210.

Figure 13:
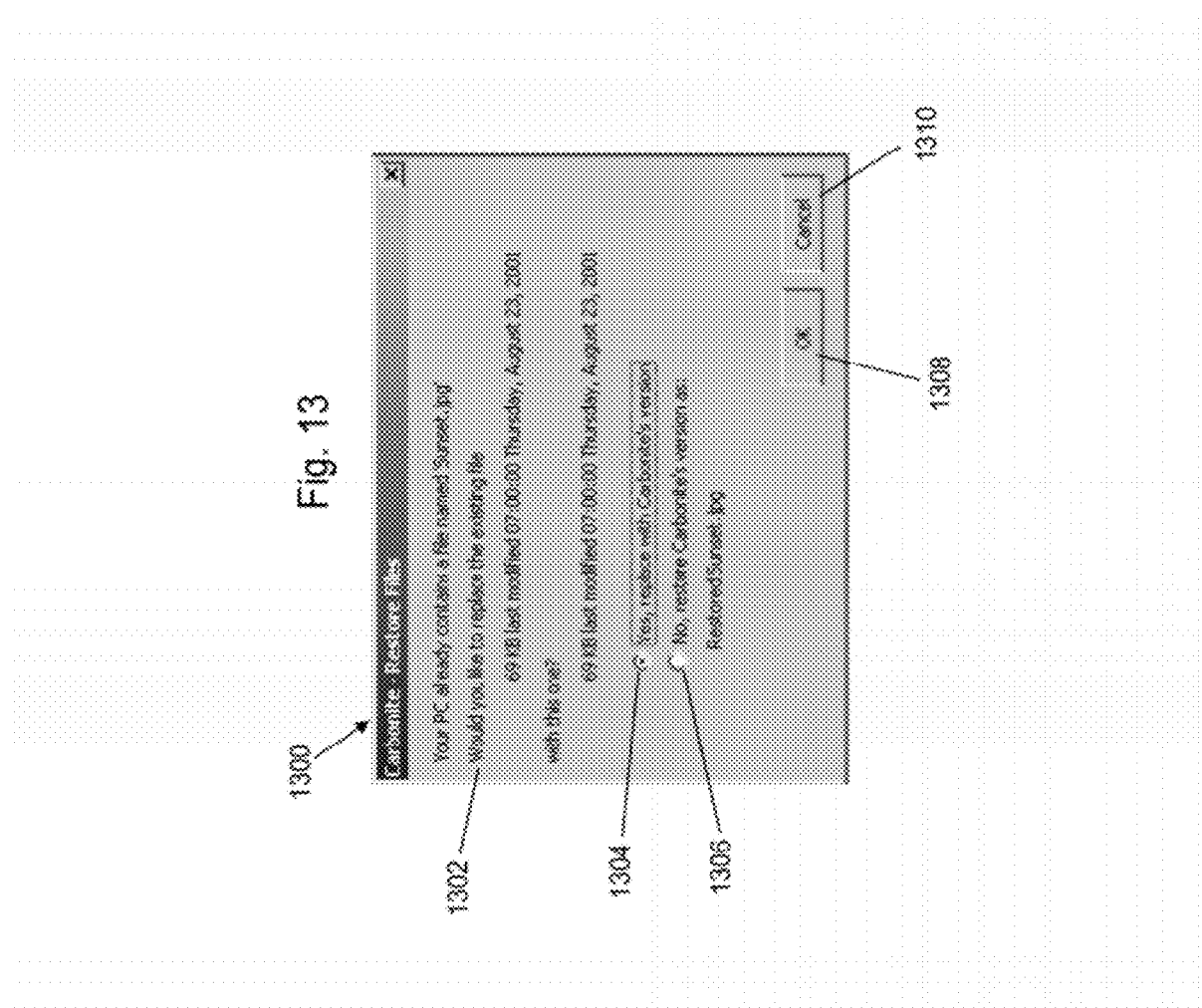
FIG. 13 depicts a restore query window in accordance with an example embodiment.

In an operation 1002, the file(s) to restore are identified based on the user selections. With reference to FIGS. 13 and 14, a restore query window 1300 may be displayed to a user if one or more of the file(s) exists in the file system of client computing device 104a. Restore query window 1300 may include descriptive text 1302, a "Yes" radio button 1304, a "No" radio button 1306, an OK button 1308, and a Cancel button 1310. Descriptive text 1302 asks the user if the file should be replaced or not. Selection of "Yes" radio button 1304 indicates that the file should be replaced in the file system of client computing device 104a. Selection of "No" radio button 1306 indicates that the file should not be replaced in the file system of client computing device 104a. Selection of OK button 1308 accepts the selected radio button option. Selection of Cancel button 1310 does not accept the selected radio button option.

In an operation 1004, the request to restore the file(s) is sent to server system 102. In an example embodiment, the requested file(s) are mapped to the unique identifier for the file and the unique identifier is included with the request. In an operation 1006, the requested file(s) are received from server system 102. The requested file(s) may not include the unique identifier for the file instead of the filename and location of the file used at client computing device 104a. As a result, the unique identifier of the requested file(s) may be mapped to the filename and location of the file used at client computing device 104a using the information stored in the backup status file.

In an operation 1008, a file system directory structure may be created. For example, if a disk of client computing device 104a is replaced or a user replaces client computing device 104a with a new computing device, the files may be restored to the replaced disk or new computing device. As a result, as the files are being restored to the replaced disk or new computing device, the file system directory structure is created as the files are restored. In an example embodiment, a user may use a browser application 1400 to visit a webpage controlled by web server application 1500 at server 108. After the user logs into server 108, as known to those skilled in the art, a "Restore" tab may be selected. The user can select the files/folders/drives to restore to the replaced disk or new computing device using a user interface presented by browser application 1400. The files/folders/drives are organized as they were on client computing device 104a. A user may be asked to "Exit Restore Mode" so that backup and restore application 1412 initiates backup processing. Alternatively, the "Exit Restore Mode" may be performed automatically when the user logs off server 108.

In an operation 1010, the received file(s) are decrypted. In an operation 1012, the decrypted file(s) are decompressed. In an operation 1014, the decompressed file(s) are stored to the appropriate location in the file system directory structure. In an operation 430, the backup directory hierarchy is updated. In an operation 432, the backup status file is updated. Processing continues at operation 420 shown with reference to FIG. 4.

In an example embodiment, server system 102 maintains a copy of a file/folder/drive for at least 30 days from the time of deletion of the file/folder/drive at client computing device 104a. As a result, a file/folder/drive which has been deleted accidentally can be restored. Purge date column 614 of folder view 604 indicates the date a deleted file is to be removed from server system 102.

With reference to FIG. 14, a client computing device 104a is shown in an example embodiment. Client computing device 104a may include display 1402, input interface 1404, a computer-readable medium 1406, a communication interface 1408, a processor 1410, browser application 1400, backup and restore application 1412, backup/restore engine 1414, and backup/restore user interface 1416. Different and additional components may be incorporated into client computing device 104a.

Display 1402 presents information to a user of computing device 104a as known to those skilled in the art. For example, display 1402 may be a thin film transistor display, a light emitting diode display, a liquid crystal display, or any of a variety of different displays known to those skilled in the art now or in the future.

Input interface 1404 provides an interface for receiving information from the user for entry into computing device 104a as known to those skilled in the art. Input interface 1404 may use various input technologies including, but not limited to, a keyboard, a pen and touch screen, a mouse, a track ball, a touch screen, a keypad, one or more buttons, etc. to allow the user to enter information into computing device 104a or to make selections presented in a user interface displayed on display 1402. Input interface 1404 may provide both an input and an output interface. For example, a touch screen both allows user input and presents output to the user.

Computer-readable medium 1406 is an electronic holding place or storage for information such as a memory so that the information can be accessed by processor 1410 as known to those skilled in the art. Computer-readable medium 1406 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, tapes, etc. Computing device 104a may have one or more memories that use the same or a different memory technology. Memory is further any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, tapes, etc.

Communication interface 1408 provides an interface for receiving and transmitting messages, files, and any other information communicable between devices using various protocols, transmission technologies, and media as known to those skilled in the art.

Processor 1410 executes instructions as known to those skilled in the art. The instructions may be carried out by a special purpose computer, logic circuits, or hardware circuits. Thus, processor 1410 may be implemented in hardware, firmware, software, or any combination of these methods. The term "execution" is the process of running an application or the carrying out of the operation called for by an instruction. The instructions may be written using one or more programming language, scripting language, assembly language, etc. Processor 1410 executes an instruction, meaning that it performs the operations called for by that instruction. Processor 1410 operably couples with display 1402, with input interface 1404, with computer-readable medium 1406, and with communication interface 1408 to receive, to send, and to process information. Processor 1410 may retrieve a set of instructions from a permanent memory device and copy the instructions in an executable form to a temporary memory device that is generally some form of RAM. Computing device 104a may include a plurality of processors that use the same or a different processing technology.

Backup and restore application 1412 performs operations associated with backup and restore processes. Some or all of the operations and interfaces described with reference to FIGS. 2-13 may be embodied in backup and restore application 1412. The operations may be implemented using hardware, firmware, software, or any combination of these methods. With reference to the example embodiment of FIG. 14, backup and restore application 1412 is implemented in software stored in computer-readable medium 1406 and accessible by processor 1410 for execution of the instructions that embody the operations of backup and restore application 1412. Backup and restore application 1412 may be written using one or more programming languages, assembly languages, scripting languages, etc. Backup and restore application 1412 may instantiate backup/restore engine 1414 and backup/restore user interface 1416.

With reference to FIG. 15, components of server system 102 are shown in accordance with an example embodiment. Server system 102 includes server 108. Server 108 may include a display 1502, an input interface 1504, a computer-readable medium 1506, a communication interface 1508, a processor 1510, web server application 1500, a file system manager application 1512, and a bandwidth manager application 1514. Different and additional components may be incorporated into server 108. Server 108 and/or database 110 may store copies of the files selected for backup processing. Information about client computing systems 104 may be stored and maintained in database 110. For example, installation and registration information related to client computing systems 104 may be stored in database 110. Server 108 may comprise a plurality of computing devices.

Display 1502 presents information to a user of server 108 as known to those skilled in the art. For example, display 1502 may be a thin film transistor display, a light emitting diode display, a liquid crystal display, or any of a variety of different displays known to those skilled in the art now or in the future.

Input interface 1504 provides an interface for receiving information from the user for entry into server 108 as known to those skilled in the art. Input interface 1504 may use various input technologies including, but not limited to, a keyboard, a pen and touch screen, a mouse, a track ball, a touch screen, a keypad, one or more buttons, etc. to allow the user to enter information into server 108 or to make selections presented in a user interface displayed on display 1502. Input interface 1504 may provide both an input and an output interface. For example, a touch screen both allows user input and presents output to the user.

Computer-readable medium 1506 is an electronic holding place or storage for information so that the information can be accessed by processor 1510 as known to those skilled in the art. Computer-readable medium 1506 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, tape, etc. Server 108 may have one or more memories that use the same or a different memory technology.

Communication interface 1508 provides an interface for receiving and transmitting messages, files, and any other information communicable between devices using various protocols, transmission technologies, and media as known to those skilled in the art.

Processor 1510 executes instructions as known to those skilled in the art. The instructions may be carried out by a special purpose computer, logic circuits, or hardware circuits. Thus, processor 1510 may be implemented in hardware, firmware, software, or any combination of these methods. Processor 1510 executes an instruction, meaning that it performs the operations called for by that instruction. Processor 1510 operably couples with display 1502, with input interface 1504, with computer-readable medium 1506, and with communication interface 1508 to receive, to send, and to process information. Processor 1510 may retrieve a set of instructions from a permanent memory device and copy the instructions in an executable form to a temporary memory device that is generally some form of RAM. Server 108 may include a plurality of processors that use the same or a different processing technology.

File system manager application 1512 performs operations associated with managing a file system which supports backup and restore processes for the plurality of computing devices 104. Some or all of the operations described with reference to FIG. 16 may be embodied in file system manager application 1512. The operations may be implemented using hardware, firmware, software, or any combination of these methods. With reference to the example embodiment of FIG. 15, file system manager application 1512 is implemented in software stored in computer-readable medium 1506 and accessible by processor 1510 for execution of the instructions that embody the operations of file system manager application 1512. File system manager application 1512 may be written using one or more programming languages, assembly languages, scripting languages, etc.

Bandwidth manager application 1514 performs operations associated with managing a bandwidth usage of the plurality of computing devices 104 utilizing the backup and restore processes of server system 102. Bandwidth manager application 1514 implements and enforces a set of policies that govern the rate at which client computing devices 104 are allowed to upload client files to and download client files from server system 102. The overall available rate (bandwidth) is configured at server system 102 and divided among the client computing devices using server system 102. Some or all of the operations described with reference to FIGS. 17-18 may be embodied in bandwidth manager application 1514. The operations may be implemented using hardware, firmware, software, or any combination of these methods. With reference to the example embodiment of FIG. 15, bandwidth manager application 1514 is implemented in software stored in computer-readable medium 1506 and accessible by processor 1510 for execution of the instructions that embody the operations of bandwidth manager application 1514. Bandwidth manager application 1514 may be written using one or more programming languages, assembly languages, scripting languages, etc.

Backup files may be organized by file system manager application 1512 using the unique identifier assigned to each client file received based on the device identifier for client computing device 104*a*, the session identifier, the file identifier, and the file version number associated with each file. Web server application 1500 may assign the device identifier for client computing device 104*a* when backup and restore application 1412 is installed and registered. The session identifier is created/updated each time client computing device 104*a* connects to server 108 and may start at one and increment each time a user connects to server 108. The file identifier is created by backup and restore application 1412 for each file selected for backup processing. The file identifier may include a counter incremented for each file selected for backup from client computing device 104*a*. The file version number distinguishes different versions of the same file and may be incremented when a file is modified.

File system manager application 1512 provides reliable, massive data storage that can be moved at high data rates between network 106, random access storage (disk), and sequential access storage (tape). The functionality provided by file system manager application 1512 may be distributed across a plurality of computing devices which interact to provide the described functionality as known to those skilled in the art. In an example embodiment, server system 102 further includes a first storage device 1530, a second storage device 1532, and a third storage device 1534. Server 108 is in communication with first storage device 1530, second storage device 1532, and third storage device 1534. Server 108, first storage device 1530, second storage device 1532, and third storage device 1534 may communicate using various transmission media that may be wired or wireless and may be connected directly or through a network. Server 108, first storage device 1530, second storage device 1532, and third storage device 1534 may include computers of any form factor including servers and mainframes. Server system 102 may include a fewer or a greater number of devices without limitation. First storage device 1530, second storage device 1532, and third storage device 1534 further may include electronic file storage systems of any media type including optical media storage, magnetic media storage, semiconductor media storage, magneto-optical media storage, etc. that provide random and/or sequential data access.

Figure 16:
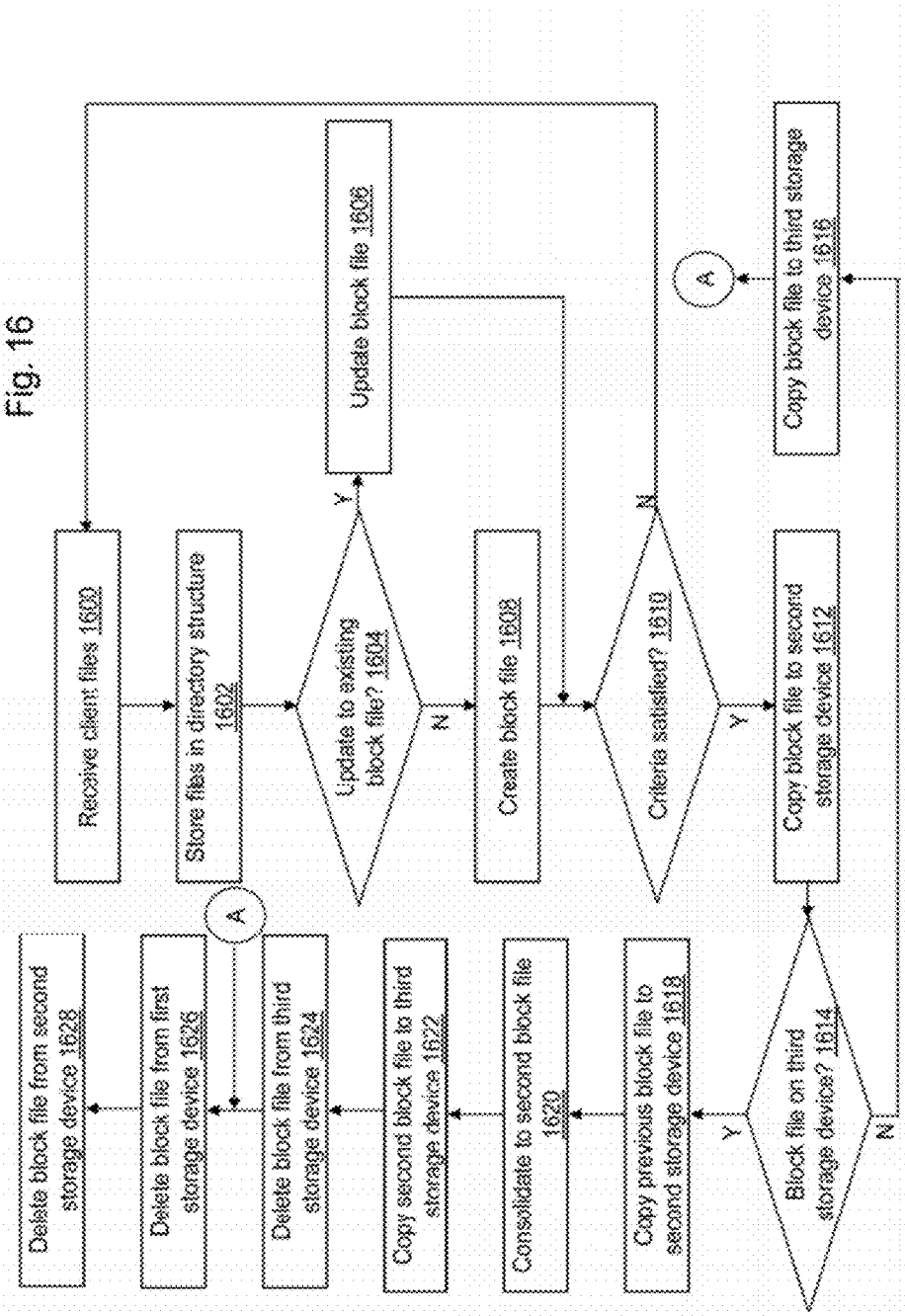
FIG. 16 is a flow diagram illustrating example operations performed by a file system manager of the server system of FIG. 15 in accordance with an example embodiment.

With reference to FIGS. 15 and 16, example operations associated with file system manager application 1512 are described. Additional, fewer, or different operations may be performed, depending on the embodiment. The order of the operations is not intended to be limiting. In an operation 1600, server system 102 receives a plurality of electronic files 1520 from client computing device 104a using network 106. In an example embodiment, web server application 1500 provides the interfaces accessed by the user using browser application 1400. In an example embodiment, server 108 receives the plurality of electronic files 1520. In an alternative embodiment, first storage device 1530 may receive the plurality of electronic files 1520 directly from client computing device 104a or from server 108.

In an example embodiment, the received plurality of electronic files 1520 have been encrypted and compressed before sending to server system 102. For example, the plurality of electronic files 1520 may have been sent to server system 102 based on execution of operation 418 of FIG. 4 by backup and restore application 1412 executing at client computing device 104a. The received plurality of electronic files 1520 are stored as individual client files at server system 102. The client files may be stored in compressed or uncompressed format and in encrypted or unencrypted format. In an example embodiment, the client files are stored in compressed and encrypted format on first storage device 1530.

In an operation 1602, the client files are stored in a directory structure at first storage device 1530 that is organized by the device identifier for client computing device 104a and the session identifier. The directory structure may be created as the client files are stored at first storage device 1530. The device identifier for client computing device 104a determines a base directory for all files backed up from client computing device 104a. Below the base directory is a session sub-directory created based on the session identifier. Below each session sub-directory are the files backed up from client computing device 104a during that session. The filenames may be constructed based on the device identifier for client computing device 104a, the session identifier, the file identifier, and the file version number. For example, C:\C317\S342\C317-S342-F000771-V000002 includes the absolute path and filename of a file stored at first storage device 1530. As a result, first storage device 1530 need not keep track of the original filename or pathname. A mapping of the original filename to the filename as stored on first storage device 1530 may be maintained at client computing device 104a, for example, in the backup status file. In an example embodiment, first storage device 1530 is a redundant disk system.

In operation 1604, whether or not the stored files are an update to an existing block file is determined. If the stored files are not an update, processing continues at an operation 1606. If the stored files are an update, processing continues at an operation 1608. In an example embodiment, client files are stored in one or more block files which are large files. Client files generally are smaller than a block file though very large client files may span a plurality of block files. A block file is grown in units of a "block" such that another block of memory is allocated for the block file after a previously allocated block of memory is filled. For example, the size of a block may be four megabytes (MB), and the size of a block file may be one gigabyte (GB). Smaller or larger sizes having different relationships may be used without limitation and may be optimized based on the computer system on which the storage process is implemented.

A block file includes several layers of headers and trailers to efficiently and reliably organize the client files stored within. The information included in the headers/trailers may be organized into fields of various bit lengths. In an example embodiment, the block file includes a block file header, a block header, a cluster header, the client file header, the client file trailer, a client file piece header, a block trailer, and a skip header. Each of the headers/trailers include fields that indicate the type and size of the header/trailers. The structure of the block file minimizes or eliminates the need to write to a particular offset in the block file more than once. Thus, the block file is written to at ever increasing offsets. For example, the overall size of a client file is contained in a client file trailer instead of a client file header. As a result, the client file header is not updated once the overall size of a file is determined. Use of this technique eliminates potential inconsistencies in a block file when a later offset is written to and the system crashes before an earlier offset is updated.

In an example embodiment, the block file header appears at the beginning of each block file and includes application-specific information and the type of data stored in the block file. Storing client files in block files made up of blocks supports increased performance because disk fragmentation is minimized, because the sending and receiving computing devices can optimize their buffering techniques based on the uniform, large size, and because computer disk and tape systems work most efficiently when large amounts of data are sent to them at very fast and consistent rates.

In an example embodiment, the block header appears at the beginning of each block and includes a size of the block, a block number, the unique identifier of a first client file stored in the block, and a first timestamp when the client sent the first client file stored in the block to server system 102. In an example embodiment, the block trailer appears at the end of each block and includes a next offset in the block file to write to, the unique identifier of a last client file stored in the block, and a last timestamp when the client sent the last client file stored in the block to server system 102. The next offset may be defined based on a memory address of a next block of memory allocated for the block file. In an example embodiment, the skip header appears in the block file if there is unused space in a block. For example, if there are a small number of bytes remaining in a block such that not even a header can fit in the remaining space in the block, the skip header is added to indicate that the next meaningful information is at the beginning of the next block.

A typical server disk sub-system includes a plurality of disk drives, which each provide sector remapping features to provide automatic recovery from disk sector failures. The disk drives are connected to a disk controller which may provide redundant array of independent drives (RAID) features to provide automatic recovery from a disk drive failure. The disk controller may be controlled by a software driver which is integrated into the operating system (OS) of first storage device 1530. Despite the many reliability features built into a server disk sub-system, failures are still relatively common in high usage 24/7 operations. To support reliable data recovery in the event of a disk failure, the client files also are stored in clusters at first storage device 1530. In an example embodiment, a size of the cluster is selected to match an allocation unit size of the OS file system so that cluster read/write operations become "atomic." For example, a cluster size of 64 kilobytes (kB) may be used for the Windows NT file system.

In an example embodiment, the cluster header appears at the start of each cluster and includes a unique data value to identify it as a valid cluster header, the unique file identifier (UFI), and a cluster sequence number. In an example embodiment, the unique data value is a value unlikely to occur randomly so that when the value is identified, the occurrence likely indicates a cluster. Thus, the unique data value can be used as an integrity check. Depending on the size of the client file and the cluster size, the client file may be divided into a plurality of clusters. At the start of each client file, directly after the cluster header, the client file header includes sufficient data to allow the file's name and directory location to be reconstructed and a timestamp that indicates the time that client computing device 104*a* sent the file to server system 102. Subsequent clusters including portions of the client file do not include the client file header. Thus, the client file header is included in the first cluster which includes the client file. A series of clusters are linked together by the cluster headers which contain the same UFI. The cluster sequence number indicates the order in which the file is subdivided and written to the clusters. If a client file is deleted, the client file header and the cluster header of the first cluster storing the client file are updated to indicate that the client file is no longer a valid file.

Data integrity checks can be performed by reading the chain of cluster headers within a block file and ensuring that the UFIs, cluster sequence numbers, and the file name/location information is correct. In the event of a disk sub-system failure, the data can be recovered by reading each cluster on the disk. The data may be read quickly by optimizing the order in which clusters are read. Each cluster header read is examined and the cluster contents are linked into a cluster list for each UFI. When the cluster with sequence number zero is read indicating the first cluster, a deleted file check is performed. If the file is marked as deleted, the cluster list is discarded. If it is valid the additional file name/location data is recorded. When all clusters have been read, the client files may be reconstructed from the cluster lists and file name/location data. If a cluster has been corrupted or is unreadable, the undamaged part of the client file can be recovered. Thus, each client file can be recovered up to the last cluster that was written successfully. Only if the first cluster is unreadable is an entire client file unrecoverable.

In an example embodiment, the client file trailer appears after the data associated with the client file and includes a size of the client file, where the client file header is located in the block file, and whether or not the client file is complete. In an example embodiment, the client file piece header appears zero or more times for each client file, and contains a piece number and a size of the client file. The client file piece header is added to the block file whenever the transfer of a client file from client computing device 104*a* to server system 102 is interrupted. The client file piece header aids in resuming the transfer of the interrupted client file.

When a user at client computing device 104*a* requests a client file from server 108, the request includes a timestamp included with the client file when the client file was sent to server system 102. The timestamp included in the request is used to efficiently search the block file for the client file requested using the timestamps included in the block header and the block trailer.

Client computing device 104*a* may send and receive files in small packets through intermediate servers on the way to and from server system 102. In these situations, performance may be improved when the intermediate servers buffer the small packets into large buffers before forwarding them to client computing device 104*a* or server system 102. The size of the larger buffers can be determined either by an absolute size threshold or by an idle timeout period. Using large buffers between intermediate servers and server system 102 improves performance by reducing network protocol overhead and by allowing file system manager application 1512 to store less header and trailer information in the block file resulting in a smaller block file and faster processing.

With continuing reference to FIG. 16, in operation 1606, the client files are added to the existing block file. In operation 1608, the block file is created and the client files are added to the created block file. In an operation 1610, whether or not a test criterion is satisfied is determined, for example, if a more cost effective storage solution is available for infrequently accessed/updated client files. In an example embodiment, the test criterion is expiration of a time period from receipt of the plurality of electronic files 1520. For example, the test criterion may be three months. Other test criteria may be used. If the criterion is not satisfied, processing continues at operation 1600 to possibly received additional client files from client computing device 104*a*. If the criterion is satisfied, processing continues at an operation 1612. In operation 1612, the block file is copied to second storage device 1532. In an example embodiment, second storage device 1532 is a high-speed, non-redundant disk system that provides random data access and may be a less expensive storage option.

In an operation 1614, whether or not a previous block file is stored on third storage device 1534 is determined. In an example embodiment, third storage device 1534 includes a robotic magnetic tape library that provides sequential data access. If a previous block file is not stored on third storage device 1534, processing continues at an operation 1616. In operation 1616, the block file is copied to third storage device 1534 and processing continues at an operation 1626.

If a previous block file is stored on third storage device 1534, processing continues at an operation 1618. In operation 1618, the previous block file is copied from third storage device 1534 to second storage device 1532. For example, the previous block file is copied from a first tape of third storage device 1534 to second storage device 1532. In operation 1620, the previous block file is consolidated with the block file copied from first storage device 1530 to form a second block file. For example, client files that the user at client computing device 104*a* has requested no longer be backed-up may not be included in the second block file. Additionally, client files deleted from client computing device 104*a* may not be included in the second block file.

In an operation 1622, the second block file is copied to third storage device 1534. For example, the second block file may be copied to a second tape. In an operation 1624, the previous block file is deleted from third storage device 1534. For example, the previous block file may be deleted from the first tape. In operation 1626, the block file is deleted from first storage device 1530. In an operation 1628, the block file, the previous block file, and/or the second block file are deleted from second storage device 1532. An index of client files stored on third storage device 1534 may be stored in database

110. The directory structure created at first storage device 1530 may also be deleted after creation of the block file.

Figure 17:
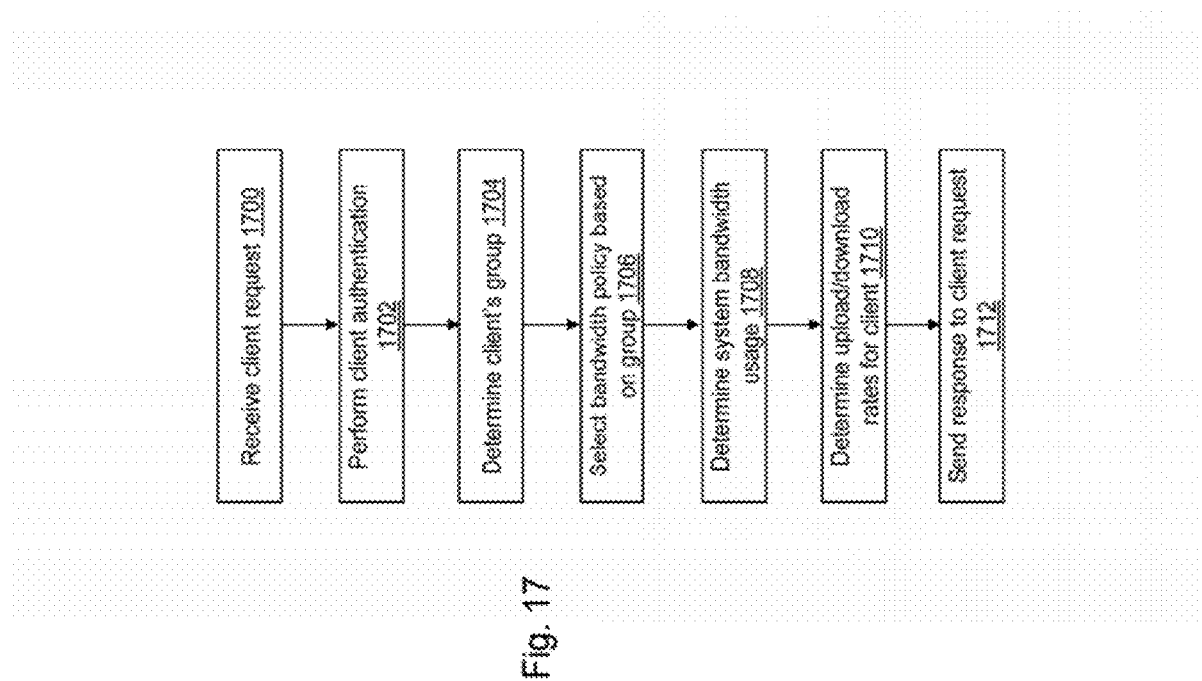
FIG. 17 is a flow diagram illustrating example operations performed by a bandwidth manager of the server system of FIG. 15 in accordance with an example embodiment.

With reference to FIGS. 15 and 17-18, example operations associated with bandwidth manager application 1514 are described. Additional, fewer, or different operations may be performed, depending on the embodiment. The order of the operations is not intended to be limiting. In an operation 1700, a request is received from client computing device 104a. For example, the request may be a request to upload a modified client file to server system 102 or to restore a client file to client computing device 104a from server system 102. In an operation 1702, a client authentication is performed based on information included in the request to authenticate use of the backup/restore system by client computing device 104a. For example, database 110 may include data from which to authenticate client computing device 104a using data included in the request. If client computing device 104a is authenticated, a client group for client computing device 104a is determined in an operation 1704. For example, with reference to FIG. 18, seven computing devices 104b of the plurality of computing devices 104 is accessing server system 102. The seven computing devices 104b are organized into a first client group 1800, a second client group 1802, and a third client group 1804. Client computing device 104a is a member of first client group 1800. The client groups may be based on a type of subscription. The information relating the client computing device 104a with a client group may be stored in database 110.

In an operation 1706, a bandwidth policy is selected based on the determined client group. The bandwidth policy information may be stored in database 110. The bandwidth policy may include a plurality of settings that are applied to each client computing device in the client group. Settings may include: a maximum upload short-term rate, a guaranteed upload short-term rate, a maximum download short-term rate, a guaranteed download short-term rate, a maximum upload long-term rate, a guaranteed upload long-term rate, a maximum download long-term rate, and a guaranteed download long-term rate. In an example embodiment, a short-term may be, for example, approximately one minute to approximately an hour, and a long-term may be, for example, approximately one day to approximately one week. In an example embodiment, the short-term and long-term time intervals can be adjusted by a user of server 108.

In an operation 1708, a system bandwidth usage is determined based on a current usage of the bandwidth by the seven computing devices 104b. In an operation 1710, an upload/download rate is determined for client computing device 104a based on the determined system bandwidth usage and the selected bandwidth policy. For example, for each of the seven computing devices 104b, server 108 measures the number of bits uploaded/downloaded every five seconds, and from that information calculates the kilobits per second that the computing device is uploading/downloading from server 108. Server 108 maintains an aggregate maximum bandwidth over which the sum of the bandwidths of the seven computing devices 104b may not exceed. When there is a moderate shortage of bandwidth, server 108 distributes bandwidth to the seven computing devices 104b above the guaranteed rates according to additional group policies. A moderate shortage of bandwidth may be indicated when the seven computing devices 104b can upload/download at the guaranteed short-term and long-term rates, but not all of the seven computing devices 104b can upload or download at their maximum short-term and long-term rates.

In an example embodiment, the client group bandwidth policy determines the order that the following example criteria may be applied when granting bandwidth above the guaranteed short-term and long-term rates: upload versus download, type of client files uploaded/downloaded, amount of credit based on past low-bandwidth usage, and amount of credit based on low server disk space utilization. For example, a bandwidth policy can be established that favors client computing devices that are downloading client files over client computing devices that are uploading client files. The bandwidth policy may also consider some types of client files to have a higher priority than other types of client files.

When there is a shortage of bandwidth, a scale-back percentage is calculated and applied to the guaranteed rates of all of the seven computing devices 104b. A shortage of bandwidth may be indicated when not all client computing devices can upload/download at the guaranteed short-term and long-term rates.

A bandwidth policy may define a series of long-term rates which become active after a previous rate expires. For example, a bandwidth policy's initial guaranteed and maximum long-term rates may last until a client has uploaded 25 GB of client files, at which time new guaranteed and maximum long-term rates may take effect. If a client computing device does not use the entire allotment of guaranteed bandwidth for a short-term period and/or a long-term period, the client computing device is given a credit for the unused bandwidth during a next usage period by the client computing device. In an example embodiment, a credit is not carried over for more than one period. A bandwidth policy may specify that certain types of data are not counted in bandwidth calculations. For example, control and protocol messages that are exchanged between the plurality of client computing devices 104 and server system 102 may be disregarded.

If there is sufficient overall bandwidth and the client computing device uses the full bandwidth allotment during an interval, the client computing device may be given a percentage (based on policy settings) more bandwidth during the next interval. If the client computing device again uses the full allotment, the client computing device may be given additional bandwidth the following interval, and so on until the client computing device reaches the maximum rates. Conversely, if the client computing device does not use the full bandwidth allotment in an interval, the client computing device may be given a percentage (based on policy settings) less bandwidth during the next interval, and so on. Managing the bandwidth allotments in this manner increases the likelihood that bandwidth is not allocated to a client computing device that is not capable of using the bandwidth to avoid wasting bandwidth.

In an operation 1712, server 108 sends a response to client computing device 104a which includes a duration of a next bandwidth interval and a number of bytes client computing device 104a is allowed to upload/download during the next bandwidth interval. The number of bytes is calculated based on the determined upload/download rate and the duration of the next bandwidth interval. Processing is repeated for each of the plurality of client computing devices 104 accessing server 108. As a result, bandwidth allocations and usage responds to current system requirements based on the bandwidth policy associated with each client group.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more".

The example embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments of the invention have been presented for purposes of illustration and of description. It is not intended to be exhaustive or to limit the invention to the precise form disclosed, and modifications and variations are possible in light of the above teachings or may be acquired from practice of the invention. For example, the described example embodiments focused on an implementation designed to operate on a computer system executing a Microsoft Windows based operating system. The present invention, however, is not limited to a particular operating environment. Those skilled in the art will recognize that the system and methods of the present invention may be advantageously operated on different platforms using different operating systems including, but not limited to, Macintosh®, LINUX, and UNIX® based operating systems.

Additionally, the functionality described may be implemented in a single executable or application or may be distributed among modules that differ in number and distribution of functionality from those described herein without deviating from the spirit of the invention. Additionally, the order of execution of the functions may be changed without deviating from the spirit of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device comprising:
a processor;
a communication interface operably coupled to the processor and configured to receive a request from a second device, the request including an indication to transfer a file between the device and the second device and an identifier of the second device; and to send a response to the second device; and
a computer-readable medium operably coupled to the processor, the computer-readable medium comprising instructions that if executed by the processor cause the device to
determine a client group associated with the second device based on the identifier of the second device;
select a bandwidth usage policy based on the determined client group;
determine a data transfer rate for transferring the file between the device and the second device based on the selected bandwidth usage policy, a bandwidth usage at the device associated with a plurality of devices, and a storage memory usage of less than a predetermined amount at the device by the second device; and
determine a number of bytes to transfer between the device and the second device during a next bandwidth interval based on the determined data transfer rate and a duration of the next bandwidth interval;
wherein the response includes the determined number of bytes to transfer during the next bandwidth interval and the duration of the next bandwidth interval.

2. A computer-readable storage device comprising computer-readable instructions stored thereon that if executed by a processor, cause a computing device to:
receive a request from a second device, the request including an indication to transfer a file between the computing device and the second device and an identifier of the second device;
determine a client group associated with the second device based on the identifier of the second device;
select a bandwidth usage policy based on the determined client group;
determine a data transfer rate for transferring the file between the computing device and the second device based on the selected bandwidth usage policy, a bandwidth usage at the computing device associated with a plurality of devices, and a storage memory usage of less than a predetermined amount at the computing device by the second device;
determine a number of bytes to transfer between the computing device and the second device during a next bandwidth interval based on the determined data transfer rate and a duration of the next bandwidth interval; and
send a response to the second device, the response including the determined number of bytes to transfer during the next bandwidth interval and the duration of the next bandwidth interval.

3. A method of managing bandwidth usage among a plurality of client devices, the method comprising:
receiving a request at a first device from a second device, the request including an indication to transfer a file between the first device and the second device and an identifier of the second device;
determining, by the first device, a client group associated with the second device based on the identifier of the second device;
selecting, by the first device, a bandwidth usage policy based on the determined client group;
determining, by the first device, a data transfer rate for transferring the file between the first device and the second device based on the selected bandwidth usage policy, a bandwidth usage at the first device associated with a plurality of devices, and a storage memory usage of less than a predetermined amount at the first device by the second device;
determining, by the first device, a number of bytes to transfer between the first device and the second device during a next bandwidth interval based on the determined data transfer rate and a duration of the next bandwidth interval; and
sending a response to the second device from the first device, the response including the determined number of bytes to transfer during the next bandwidth interval and the duration of the next bandwidth interval.

4. The method of claim 3, wherein the bandwidth usage policy includes a plurality of settings associated with the client group.

5. The method of claim 4, wherein the plurality of settings include a download rate and an upload rate.

6. The method of claim 4, wherein the plurality of settings include a short-term time interval transfer rate and a long-term time interval transfer rate, the short-term time interval shorter than the long-term time interval.

7. The method of claim 4, wherein the plurality of settings include a maximum rate and a guaranteed rate.

8. The method of claim 7, wherein the method is repeated with each of the plurality of devices as the second device.

9. The method of claim 8, wherein the determined data transfer rate is the maximum rate for each of the plurality of devices if there is sufficient bandwidth available.

10. The method of claim 8, wherein the determined data transfer rate is a percentage of the guaranteed rate if there is insufficient bandwidth available, wherein the percentage is less than 100%.

11. The method of claim 8, wherein the determined data transfer rate exceeds the guaranteed rate for each of the plurality of devices if there is sufficient bandwidth available.

12. The method of claim 11, wherein the bandwidth usage policy further applies a criterion to determine how much the determined data transfer rate exceeds the guaranteed rate.

13. The method of claim 12, wherein the criterion includes a consideration of whether the request to transfer the file is to download the file from the first device or to upload the file to the first device.

14. The method of claim 12, wherein the criterion includes a consideration of a type of the file.

15. The method of claim 12, wherein the criterion includes a consideration of a credit associated with the second device earned through usage characteristics.

16. The method of claim 15, wherein the credit is based on a past low-bandwidth usage during a previous bandwidth interval by the second device.

17. The method of claim 3, wherein the determined number of bytes to transfer during the next bandwidth interval is a percentage of a previously determined number of bytes to transfer during the prior bandwidth interval if there is sufficient bandwidth available and the second device transferred the previously determined number of bytes during the prior bandwidth interval, wherein the percentage is greater than 100%.

18. The method of claim 3, wherein the determined number of bytes to transfer during the next bandwidth interval is a percentage of a previously determined number of bytes to transfer during the prior bandwidth interval if the second device did not transfer the previously determined number of bytes during the prior bandwidth interval, wherein the percentage is less than 100%.

19. The method of claim 3, wherein the bandwidth usage policy may change automatically based on satisfaction of a criterion.

\* \* \* \* \*